(12) United States Patent
Yasui et al.

(10) Patent No.: US 8,329,001 B2
(45) Date of Patent: Dec. 11, 2012

(54) STRUCTURE, MAGNETIC RECORDING MEDIUM, AND METHOD OF PRODUCING THE SAME

(75) Inventors: Nobuhiro Yasui, Kawasaki (JP); Ryoko Horie, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1031 days.

(21) Appl. No.: 12/040,223

(22) Filed: Feb. 29, 2008

(65) Prior Publication Data
US 2008/0182014 A1    Jul. 31, 2008

Related U.S. Application Data

(62) Division of application No. 11/386,755, filed on Mar. 23, 2006, now Pat. No. 7,361,420.

(30) Foreign Application Priority Data

Mar. 25, 2005   (JP) .................................. 2005-088981
Sep. 6, 2005    (JP) .................................. 2005-258274

(51) Int. Cl.
*C23C 16/00*   (2006.01)
*C23C 14/34*   (2006.01)

(52) U.S. Cl. ............ 204/192.2; 204/192.12; 204/192.15; 216/11; 216/17; 216/22; 216/39; 216/56; 427/127; 427/128; 427/129; 427/132

(58) Field of Classification Search ............. 204/192.12, 204/192.15, 192.2; 216/11, 17, 22, 39, 56; 427/127, 128, 129, 132, 250

See application file for complete search history.

(56) References Cited

U.S. PATENT DOCUMENTS

| | | | | |
|---|---|---|---|---|
| 4,444,635 A | * | 4/1984 | Kobayashi et al. | 204/192.15 |
| 5,211,707 A | * | 5/1993 | Ditchek et al. | 438/20 |
| 5,800,950 A | | 9/1998 | Hirao et al. | 430/1 |
| 6,972,146 B2 | | 12/2005 | Den et al. | 428/138 |
| 7,081,303 B2 | | 7/2006 | Yasui et al. | 428/446 |
| 7,167,342 B2 | | 1/2007 | Yasui et al. | 360/135 |
| 2004/0005723 A1 | | 1/2004 | Empedocles et al. | 438/1 |

(Continued)

FOREIGN PATENT DOCUMENTS

JP    2004-223695 A    8/2004

(Continued)

*Primary Examiner* — Rodney McDonald
(74) *Attorney, Agent, or Firm* — Fitzpatrick, Cella, Harper & Scinto

(57) ABSTRACT

To provide a filmy structure of a nanometer size having a phase-separated structure effective for the case where a compound can be formed between two kinds of materials. A structure constituted by a first member containing a compound between an element A except both Si and Ge and $Si_nGe_{1-n}$ (where $0 \leq n \leq 1$) and a second member containing one of the element A and $Si_nGe_{1-n}$ (where $0 \leq n \leq 1$), in which one of the first member and the second member is a columnar member, formed on a substrate, whose side face is surrounded by the other member, the ratio Dl/Ds of an average diameter Dl in the major axis direction to an average diameter Ds in the minor axis direction of a transverse sectional shape of the columnar member is less than 5, and the element A is one of Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, and B.

7 Claims, 16 Drawing Sheets

U.S. PATENT DOCUMENTS

| | | | |
|---|---|---|---|
| 2004/0043208 A1* | 3/2004 | Fukutani et al. | 428/304.4 |
| 2004/0048092 A1* | 3/2004 | Yasui et al. | 428/642 |
| 2004/0196593 A1 | 10/2004 | Yasui et al. | 360/135 |
| 2005/0053773 A1 | 3/2005 | Fukutani et al. | 428/209 |
| 2005/0062033 A1 | 3/2005 | Ichihara et al. | 257/17 |
| 2006/0068080 A1 | 3/2006 | Yadav et al. | 427/8 |
| 2006/0257637 A1 | 11/2006 | Pereira et al. | 428/221 |
| 2007/0054421 A1 | 3/2007 | Ueda et al. | 438/3 |

FOREIGN PATENT DOCUMENTS

| | | |
|---|---|---|
| JP | 2004-237429 A | 8/2004 |
| JP | 2005-59125 A | 3/2005 |

* cited by examiner

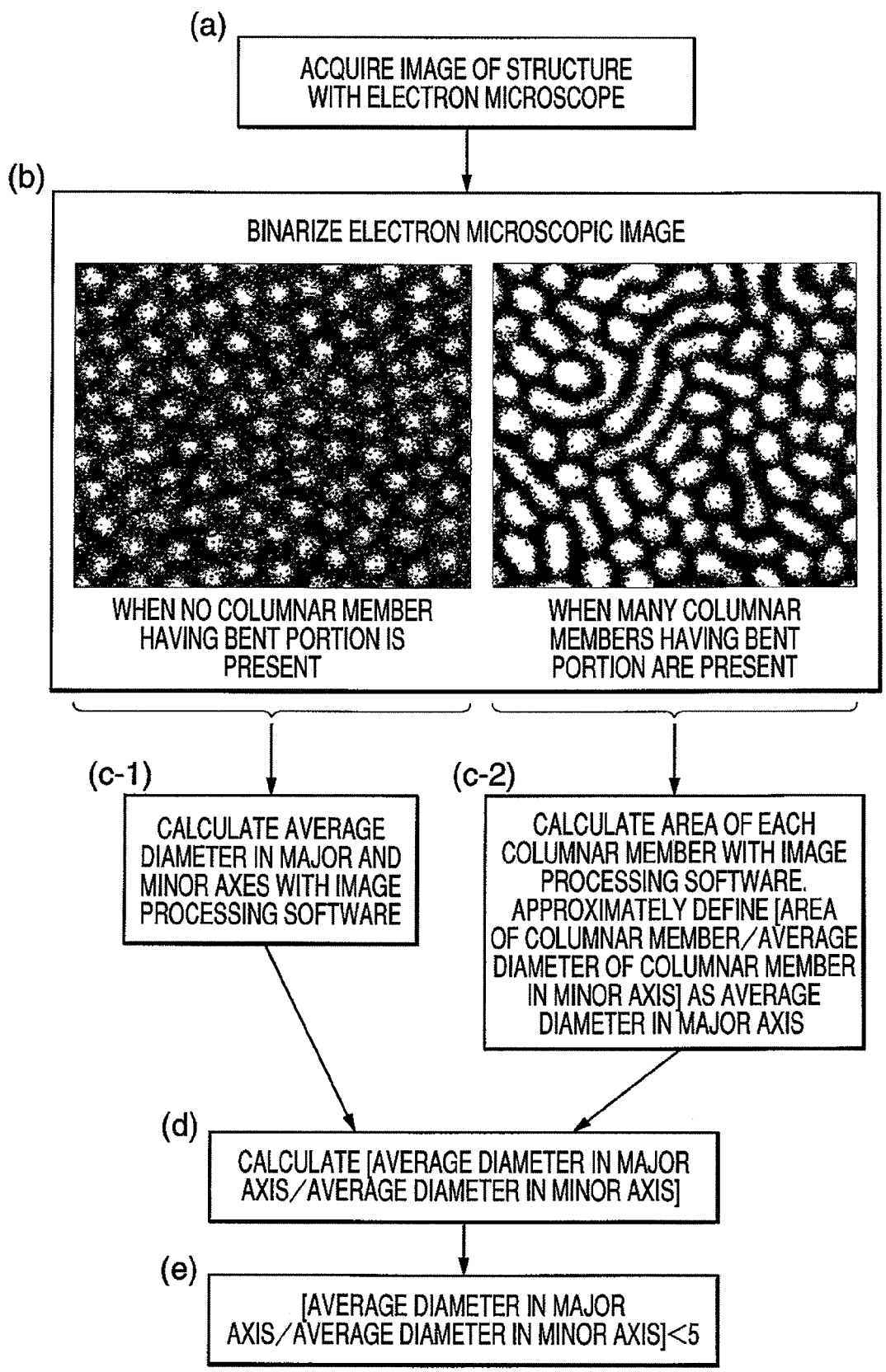

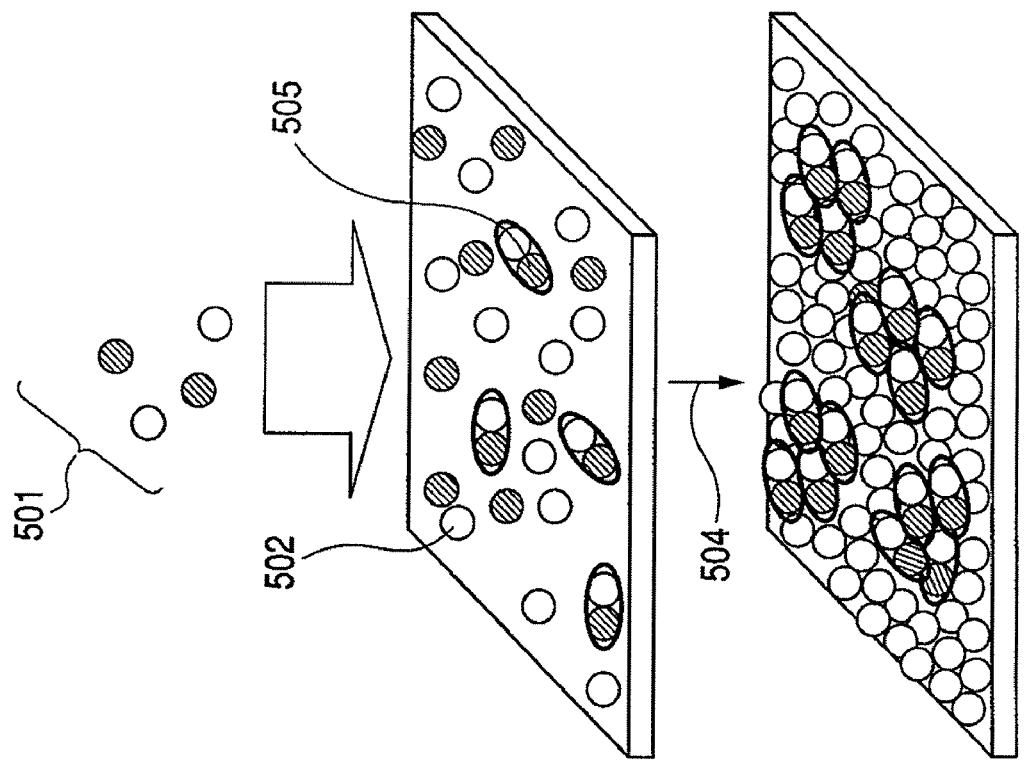
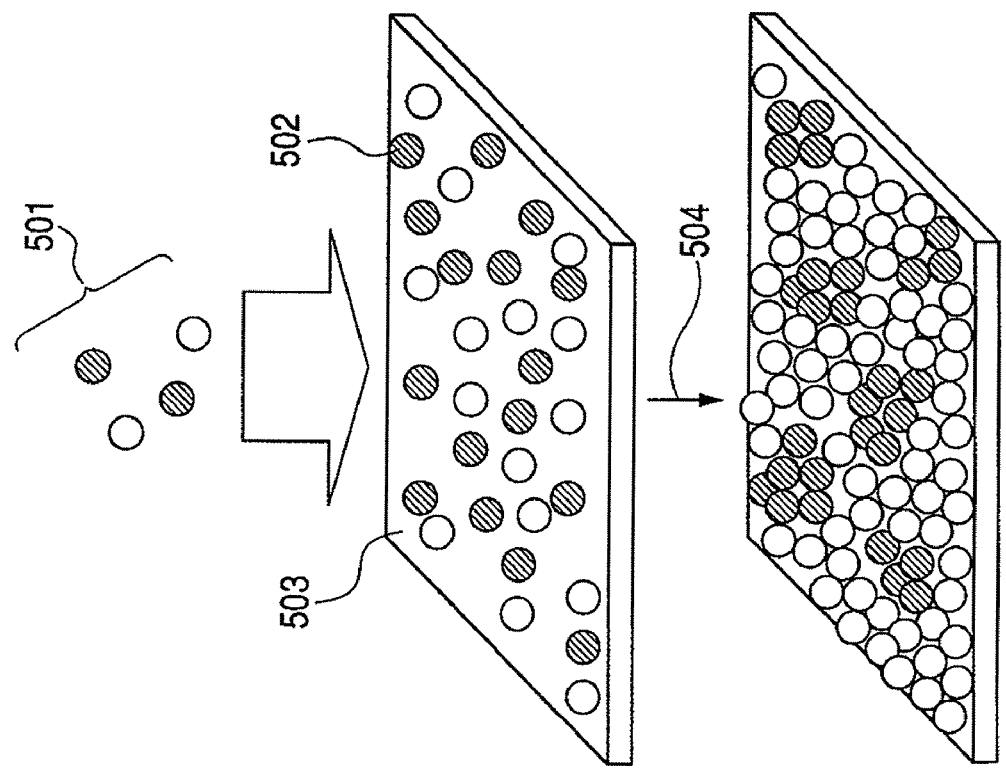

STRUCTURE, MAGNETIC RECORDING MEDIUM, AND METHOD OF PRODUCING THE SAME

CROSS REFERENCE TO RELATED APPLICATION

This application is a division of U.S. application Ser. No. 11/386,755, filed on Mar. 23, 2006 now U.S. Pat. No. 7,361,420, the disclosure of which is incorporated by reference herein in its entirety.

BACKGROUND OF THE INVENTION

1. Field of the Invention

The present invention relates to a structure of a nanometer size having a phase-separated structure or a structure obtained from such material. Furthermore, the present invention relates to a method of producing such structure and a device constituted of such structure such as an electronic device, an electrode, a magnetic recording medium, a functional film having catalytic ability, or an electron emitting device.

2. Related Background Art

There has been a growing interest in a fine structure as a functional material in recent years. An example of an approach to produce such fine structure includes an approach to produce a fine structure directly by means of a semiconductor processing technique typified by a fine pattern forming technique such as photolithography.

In addition to the above semiconductor processing technique, an approach to utilize a self-organization phenomenon or self-formation phenomenon of a material is available as a technique for producing a fine structure. This approach intends to realize a novel fine structure on the basis of a regular structure to be spontaneously formed. Out of the approaches of this kind, one disclosed in the US Published Application US-2005-0053773 involves forming a phase-separated structure between a first material and a second material, so a self-organized structure can be formed of an inorganic material.

The production of a structure as described in the above US Published Application has been considered to require that no compound between the first material and the second material be formed (for example, between aluminum and silicon). In this case, only several combinations of selectable materials are available. Therefore, there has been a demand on the ability to form a self-organizing phase-separated structure even in a combination of materials capable of forming a compound as well as such limited combinations of materials.

SUMMARY OF THE INVENTION

In view of the foregoing, an object of the present invention is to provide a structure of a nanometer size having a phase-separated structure which is effective for the case where a compound between two kinds of materials can be formed and a method of producing the structure.

In particular, an object of the present invention is to provide a structure of a nanometer size having, when a compound can be formed between $Si_nGe_{1-n}$ (where $0 \leq n \leq 1$) and an element A except both Si and Ge, an effective phase-separated structure composed of the compound between the element A and $Si_nGe_{1-n}$ (where $0 \leq n \leq 1$) and the element A or $Si_nGe_{1-n}$ (where $0 \leq n \leq 1$) and a method of producing the structure.

Another object of the present invention is to provide a structure obtained by removing a material constituting one phase from such structure having a phase-separated structure as described above.

Another object of the present invention is to provide various devices each constituted of such structure as described above.

In view of the foregoing, the present invention provides a structure including:

a first member containing a compound between an element A except both Si and Ge and $Si_nGe_{1-n}$ (where $0 \leq n \leq 1$); and a second member containing one of the element A and $Si_nGe_{1-n}$ (where $0 \leq n \leq 1$), in which one of the first member and the second member is a columnar member whose side face is surrounded by the other member;

the ratio Dl/Ds of an average diameter Dl in the major axis direction to an average diameter Ds in the minor axis direction of a transverse sectional shape of the columnar member is less than 5; and the element A is one of Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, and B.

According to the present invention, there is provided a structure of a nanometer size having a phase-separated structure even when a compound comprised of two kinds of materials can be formed. In particular, according to the present invention, there is provided a structure of a nanometer size having, when a compound can be formed between $Si_nGe_{1-n}$ (where $0 \leq n \leq 1$) and an element A except both Si and Ge, a phase-separated structure composed of the compound between the element A and $Si_nGe_{1-n}$ (where $0 \leq n \leq 1$) and the element A or $Si_nGe_{1-n}$ (where $0 \leq n \leq 1$). Removing a material constituting one phase from the structure having a phase-separated structure provides a porous structure or a needle-like structure. Various devices each using any one of those structures are also provided.

BRIEF DESCRIPTION OF THE DRAWINGS

FIG. 2 is a flow chart concerning a method of specifying the structure of the present invention from the ratio of an average diameter in a major axis direction to an average diameter in a minor axis direction;

FIGS. 5A and 5B are conceptual views each showing a process for forming a phase-separated structure;

DESCRIPTION OF THE PREFERRED EMBODIMENTS

The structure and method of producing a structure of the present invention, the concept of the formation of a structure, and the like will be described in detail with reference to the drawings. Furthermore, an electronic device, a gate electrode for a semiconductor integrated circuit, a magnetic recording medium, a functional film having catalytic ability, and an electron emitting device according to the present invention will be described.

[Structure]

Figure 1A:
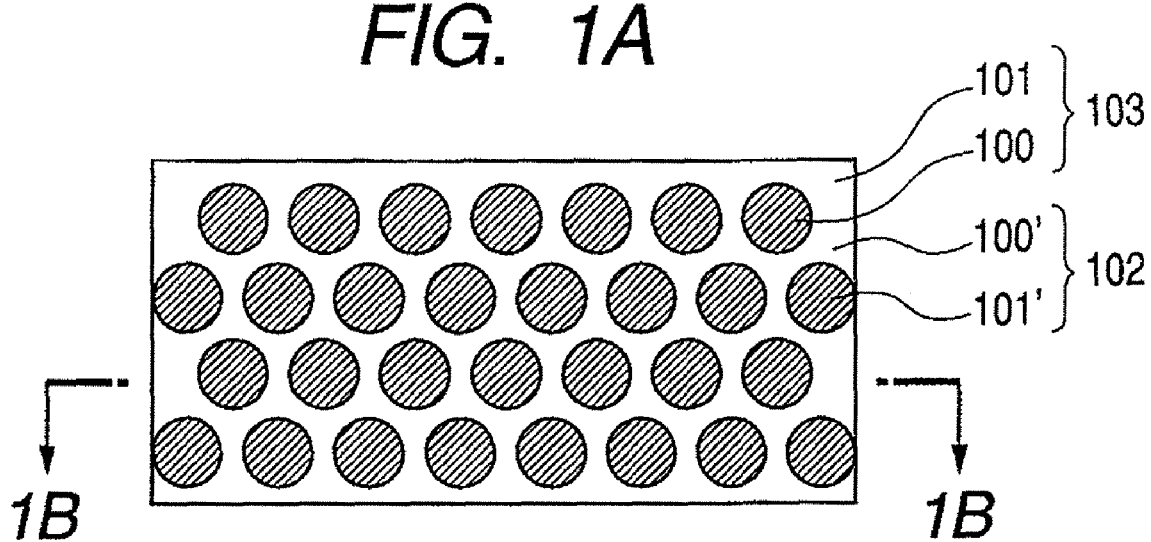
FIGS. 1A and 1B are schematic views each showing a structure of the present invention.
Figure 1B:
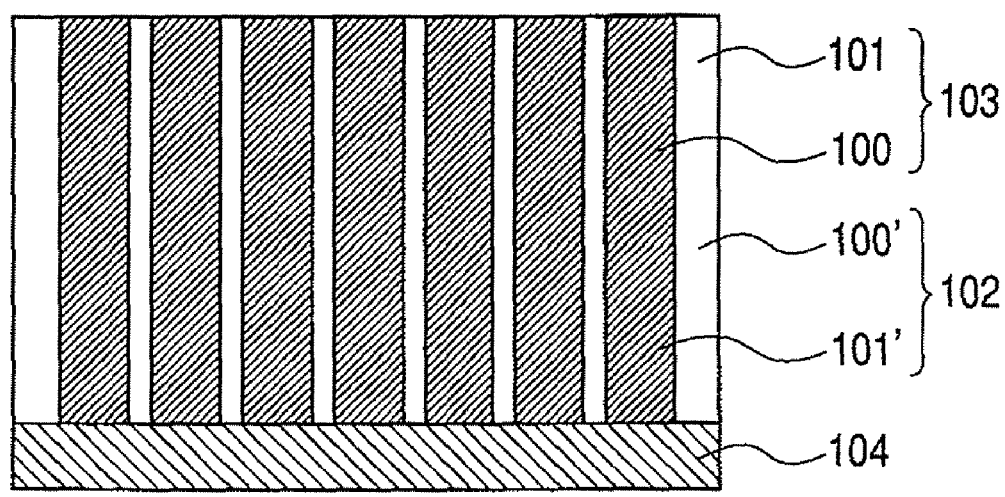

FIGS. 1A and 1B each show a schematic view of the structure of the present invention. FIG. 1A is a plan view, and FIG. 1B is a sectional view taken along the line 1B-1B of FIG. 1A.

The structure is of a film shape formed on the surface of a substrate 104.

That is, the structure includes a first member containing a compound between an element A, capable of forming a compound between the element A and $Si_nGe_{1-n}$ (where $0 \leq n \leq 1$), and $Si_nGe_{1-n}$ (where $0 \leq n \leq 1$) and a second member containing one of $Si_nGe_{1-n}$ (where $0 \leq n \leq 1$) and the element A.

$Si_nGe_{1-n}$ (where $0 \leq n \leq 1$) represents Si when n=1, Ge when n=0, or a substance containing Si and Ge when 0<n<1 (hereinafter, the substance may be abbreviated as SiGe). One of the first and second members is a columnar member, and the columnar member is formed so as to be substantially perpendicular to the surface of the substrate 104 (or an interface between the film formed on the substrate and constituted by the first and second members and the substrate).

The element A is one of Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, and B.

In a first combination 103, a first member 100 mainly containing "a compound between the element A and $Si_nGe_{1-n}$ (where $0 \leq n \leq 1$)" such as PdSi, PdGe, or PdSiGe is the columnar member. The side face of first member 100 is surrounded by a second member 101 mainly containing $Si_nGe_{1-n}$ (where $0 \leq n \leq 1$) such as Si, Ge, or SiGe. A plurality of such first members are dispersedly arranged in the structures material. In a second combination 102, a second member 101' mainly containing $Si_nGe_{1-n}$ (where $0 \leq n \leq 1$) such as Si, Ge, or SiGe is a columnar member. The side face of the second member 101' is surrounded by a first member 100' mainly containing "a compound between the element A and $Si_nGe_{1-n}$ (where $0 \leq n \leq 1$)" such as PdSi, PdGe, or PdSiGe. A plurality of such second members are dispersedly arranged in the structures material. In an actual structure, one of the first combination 103 and the second combination 102 is realized.

The columnar member 100 or 101' extend in a film thickness direction, that is, substantially perpendicular to the surface of the substrate 104. The transverse sectional shape of the member is nearly constant irrespective of position in the film thickness direction. Therefore, the transverse sectional shape of a filmy structure is substantially identical to the shape of the upper end face of the columnar member 100 or 101' forming a main surface opposite to the substrate. In FIGS. 1A and 1B, the upper end face of the columnar member 100 or 101' is of a circular shape. However, the shape is not limited to the circular shape. The shape may be an elongated elliptical shape, or further elongated and bent structure. However, the upper end face of the columnar member 100 or 101' is preferably of a circular shape, and a variation in size among plural columnar members is preferably small. In this case, in particular, the standard deviation of the diameters of the columnar members is preferably 3 nm or less, or more preferably 2 nm or less. The term "transverse sectional shape" refers to a shape when the film formed on the substrate and constituted by the first and second members is seen from the direction perpendicular to an interface between the film and the substrate. That is, the term refers to the plan shape of the film when the film is formed on the substrate.

In FIGS. 1A and 1B, the columnar member 100 or 101' is regularly arranged in a honeycomb fashion. However, the arrangement is not limited thereto. However, when a filmy structure is formed on the substrate 104 in a non-equilibrium state by means of such sputtering method as described later, a honeycomb arrangement tends to be formed in a self-organization manner in a region where a film to be formed has a sufficient thickness. In addition, the regular arrangement of the columnar member 100 or 101' is maintained in a certain region, so the regularity may be disordered at a boundary between different regions.

Figure 3A:
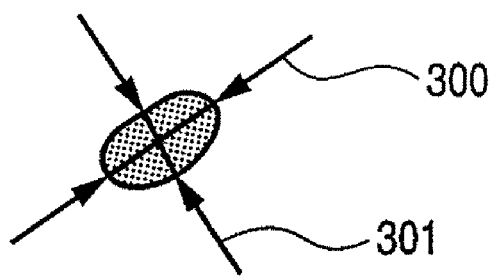
FIGS. 3A and 3B are schematic views each showing a diameter in a major axis direction and a diameter in a minor axis direction in the structure of the present invention.
Figure 3B:
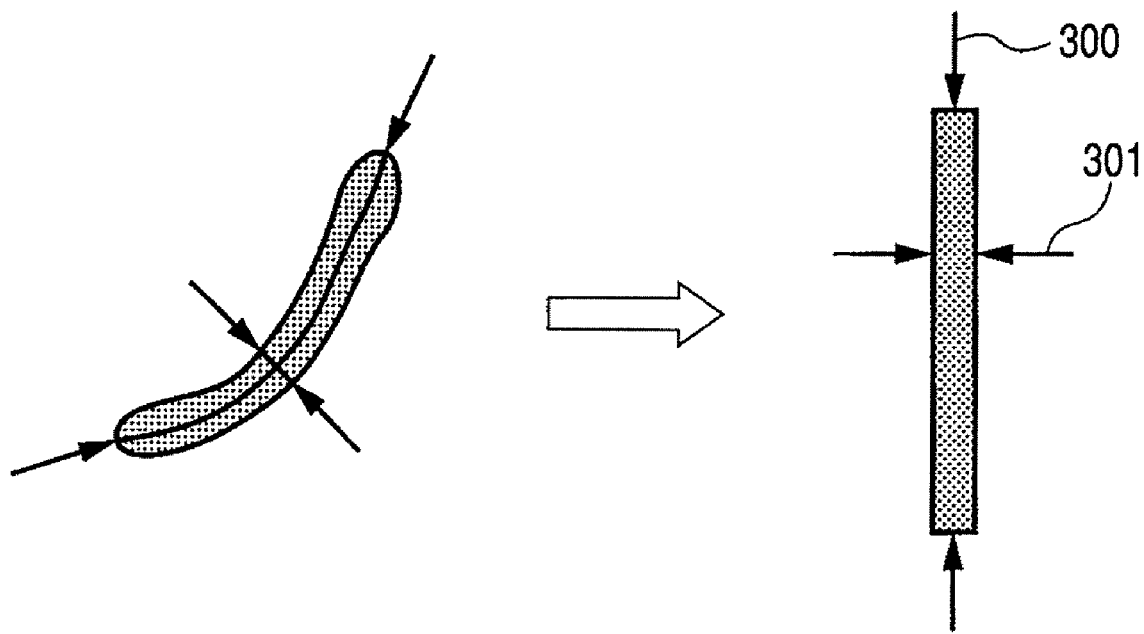

In the present invention, the ratio Dl/Ds of an average diameter Dl in the major axis direction to an average diameter Ds in the minor axis direction of a transverse sectional shape (or end face shape) of the columnar member 100 or 101' is less than 5. As shown in FIG. 3A, when no columnar member having a bent portion in its transverse sectional shape (or end face shape) is present, the major axis direction and the minor axis direction in the transverse sectional shape (or end face shape) of a columnar member are clearly recognized, and a diameter 300 in the major axis direction and a diameter 301 in the minor axis direction are easily defined. However, the definition is complicated in case of a columnar member having a bent portion as shown in FIG. 3B. The diameter 301 in the minor axis direction can be defined at an arbitrary position with a short segment in the transverse sectional shape (or end face shape) of a columnar member as a width because the widths of plural columnar members are relatively constant. However, the diameter in the major axis direction cannot be calculated by drawing a straight line. In this case, the following procedure is effective. A bent portion in the transverse sectional shape (or end face shape) of a columnar member is elongated to be approximately regarded as an elongated rectangle to calculate the diameter 300 in the major axis direction.

Here, a method of determining whether a structure satisfies the relationship of [average diameter Dl in major axis direction]/[average diameter Ds in minor axis direction]<5 will be described with reference to the flow chart shown in FIG. 2.

(a) At first, the surface of the structure of the present invention is observed with an electron microscope so that an image with which the shape of the upper end face of a columnar member can be identified is obtained. At this time, the structure may be observed unclearly with a scanning electron microscope depending on an element constitution. Therefore, the image may be obtained by means of not only image formation by a secondary electron from an upper end face but also image formation by a transmission electron with the aid of a transmission electron microscope.

(b) The image obtained in the above step (a) is processed by means of an appropriate software for binarization. For example, (b) of FIG. 2 shows two kinds of binarized images of a structure belonging to the present invention. Here, the structure is characterized in that it is difficult to establish the concept of a diameter for a columnar member having an elongated upper end face. In view of this, cases upon analysis were classified as described below.

[When No Columnar Member Having a Bent Portion is Present]

(c-1) A columnar member in the image binarized by means of an image processing software is recognized, and each of the diameters in the major axis direction and the minor axis direction is calculated.

[When a Large Number of Columnar Members Each Having a Bent Portion are Present]

(c-2) Columnar members in the image binarized by means of an image processing software are recognized, and the area of each columnar member is calculated. Furthermore, it can be observed from the image that a diameter in a direction considered to be the minor axis direction is substantially constant. Therefore, the average of diameters in the minor axis direction of plural columnar members (average diameter in the minor axis direction) is calculated. Then, the average of the values for the respective columnar members each calculated from the expression of [area of columnar member]/[average diameter in minor axis direction] is approximately defined as an average diameter in the major axis direction. This corresponds to the condition that bent columnar members are regarded as rectangles having the same length upon calculation.

(d) Next, with the respective calculated average diameters, the expression of [average diameter Dl in major axis direction]/[(average diameter Ds in minor axis direction] is calculated.

(e) Finally, the structure is determined to be that of the present invention when the value obtained in the step (d) is less than 5.

In the present invention, the average diameter in the minor axis direction of plural columnar members is in the range of, for example, 0.5 nm to 20 nm (both inclusive). In addition, the average distance between centers of gravity in the transverse sectional shapes of each columnar member and a columnar member closest to the each columnar member is, for example, 30 nm or less.

[Method of Producing Structure]

A substrate for forming a filmy structure is prepared. The substrate 104 is not particularly limited. For example, an insulating substrate composed of an oxide (such as glass or quartz glass) or of plastic is usable. A semiconductor substrate composed of, for example, silicon, germanium, gallium arsenide, indium phosphide, or the like, or a metal substrate composed of aluminum or the like can also be used depending on a purpose. A substrate subjected to patterning by means of a resist or the like is also usable. A material for the substrate 104 is not limited to the foregoing.

Furthermore, a material individually or integrally containing an element A and $Si_nGe_{1-n}$ (where $0 \leq n \leq 1$) serving as a material constituting the structure is prepared. A material individually containing Si and Ge may be used for SiGe. That is, the structure always contains a compound between the element A except both Si and Ge and $Si_nGe_{1-n}$ (where $0 \leq n \leq 1$). Accordingly, $Si_nGe_{1-n}$ (where $0 \leq n \leq 1$) and the element A needs to be prepared as raw materials; provided, however, that $Si_nGe_{1-n}$ (where $0 \leq n \leq 1$) and the element A are not needed to be isolated from each other. Any one of the forms such as a form comprising a compound between the element A and $Si_nGe_{1-n}$ (where $0 \leq n \leq 1$) and the element A, a form comprising a compound between the element A and $Si_nGe_{1-n}$ (where $0 \leq n \leq 1$) and $Si_nGe_{1-n}$ (where $0 \leq n \leq 1$), and a mixture of the element A and $Si_nGe_{1-n}$ (where $0 \leq n \leq 1$) is permitted.

Figure 20:
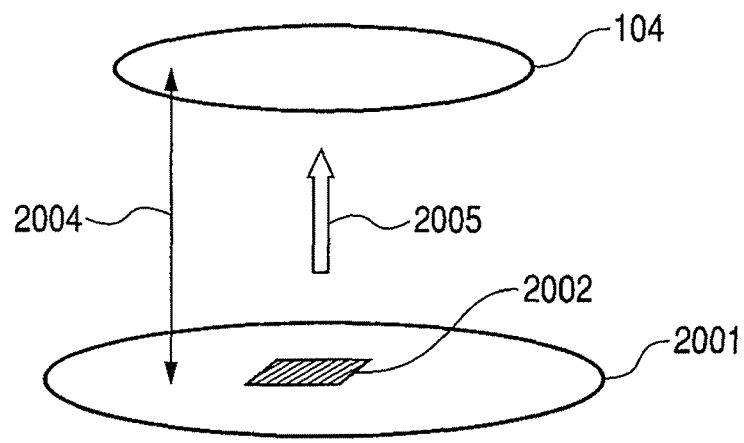
FIG. 20 is a conceptual view for explaining a sputtering method.

A target structure can be obtained by depositing elements serving as raw materials on the substrate 104 in a non-equilibrium state using those materials. At this time, the elements serving as raw materials are preferably quickly cooled on the substrate 104 with a view to forming a structure having an average diameter Ds in a minor axis direction of columnar members in the range of 0.5 nm to 20 nm (both inclusive) and an average distance between centers of gravity of a columnar member and its closest columnar member of 30 nm or less. That is, the energy of the elements serving as raw materials is preferably lost quickly. It should be noted that there is provided such a condition that surface diffusion occurs in a time scale in which the phase-separated of the elements serving as raw materials occurs. In such situation, a fine structure that cannot be easily attained by means of a conventional approach attempted with bulk (an approach to dissolve the entirety followed by quenching and solidifying the resultant in one way) can be uniformly formed in the direction in which the elements serving as raw materials are deposited. Furthermore, the deposition in a non-equilibrium state is preferably performed by means of a method to be performed in a vapor phase or a vacuum such as a sputtering method and an electron beam deposition method, particularly preferably the sputtering method. FIG. 20 shows a sputtering method. As shown in the figure, the substrate 104 is arranged so as to be opposite to a sputtering target 2001 mainly containing a raw material. The sputtering target 2001 may be an alloy or a sintered material as long as it contains a required raw material.

Alternatively, as shown in FIG. 20, one material may be arranged as a target, and another material may be arranged as a plate having an arbitrary size on the target. For example, the sputtering target 2001 is composed of $Si_nGe_{1-n}$ (where $0 \leq n \leq 1$), and a plate 2002 of a certain element (element A) arranged on the central portion of the target is composed of Pd. Furthermore, in the sputtering, a raw material is caused to sputter from the sputtering target 2001 by means of a process gas such as argon and is sequentially deposited on the substrate 104. A deposition direction 2005 with respect to the substrate 104 to be arranged so as to be opposite to the target is a direction toward which the material deposits. Furthermore, the sputtering is an approach effective in obtaining the structure of the present invention because the sputtering raw material has high energy, loses its energy quickly on the substrate 104, and diffuses on the surface of the substrate to some extent. Therefore, the formation of a structure can be precisely controlled by means of, for example, a distance 2004 between the sputtering target and the substrate, input electric power, the kind and pressure of a process gas, the temperature of the substrate 104, and a bias voltage to be applied to the substrate 104 in the sputtering method.

The structure of the present invention is based on the formation of a structure in a self-organization manner due to the mutual diffusion of elements and the like serving as raw materials on the substrate 104. In a situation where a deposition rate is excessively high, the elements and the like serving as raw materials are sequentially deposited before the completion of phase separation, so the degree of phase separation tends to lower. Therefore, a slow deposition rate is effective for separation. Increasing the distance 2004 between the sputtering target and the substrate can sufficiently lower a deposition rate. However, when a distance up to the substrate 104 is excessively long, the energy of the elements and the like serving as raw materials to be deposited reduces before the elements and the like fly to the substrate 104. As a result, even when the elements and the like have a time period for diffusion on the substrate 104, they may have insufficient energy for diffusion. In view of the foregoing, energy necessary for the raw materials flying to the substrate 104 to diffuse can be given by applying a bias voltage to the substrate 104 or by increasing the temperature of the substrate in such situation. Therefore, appropriately maintaining deposition conditions is preferable for forming the structure of the present invention in consideration of the foregoing.

Finally, the structure of the present invention is applicable to the surface of the substrate 104 of any type in addition to the above examples, and some condition to cause no damage to the substrate 104 under the respective forming conditions may be present. In addition, the thickness of the structure as a film can be increased without any limitation by lengthening a deposition time. However, the kind of the substrate 104, the kind of an underlayer to be formed as desired as the surface layer of the substrate, and the like are preferably appropriately selected in consideration of the appropriate control of a stress or the like to be generated in a film to be formed.

[Concept of Formation of Structure and the Like]

The formation of the structure of the present invention will be additionally described.

Proposals concerning the formation of a nano-scale structure utilizing self-organization on the basis of an inorganic material have been conventionally rarely made.

Figure 4A:
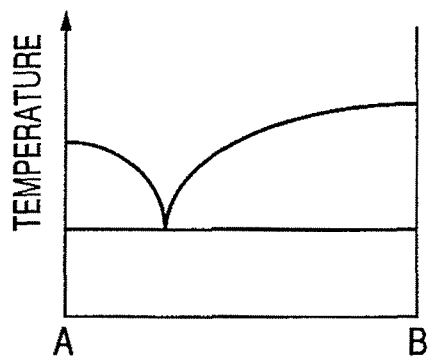
FIGS. 4A, 4B, 4C and 4D each show an example of an equilibrium diagram possessed by a raw material constituting each of a conventional structure and the structure of the present invention.

However, as described above, a phase-separated structure mainly using aluminum and silicon has been proposed. However, the proposal needs to have a binary eutectic phase diagram over the entire compositional range as shown in FIG. 4A. Therefore, it can be found that the number of combinations of elements having such phase diagram is unexpectedly small.

Thus, the achievement of such structure by means of other combinations of elements has been considered to be extremely difficult. That is, in the case of a eutectic type over the entire compositional range in a binary system like the conceptual view shown in FIG. 5A, a phase separation process 504 of flying elements 501 (each in the form of an atom or the like) on a substrate surface 503 is expected to proceed smoothly because no compound comprised of those binary elements is produced.

Figure 4B:
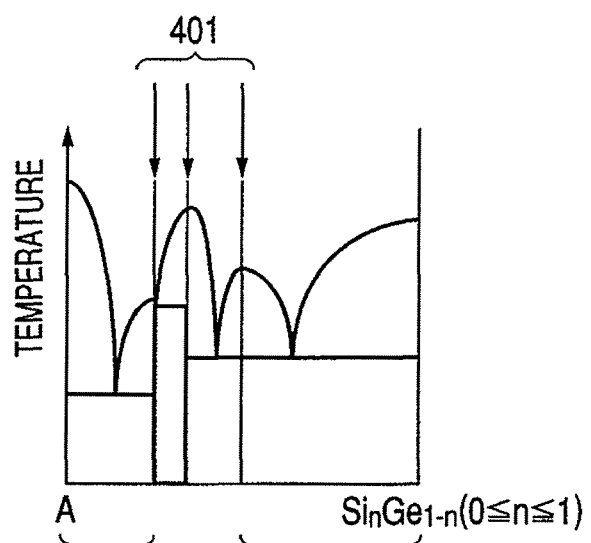

However, in the case of a binary system phase diagram like FIG. 4B, plural formable compounds 401 are present, so it is expected to be difficult for the formation of a compound on the substrate 104 to progress simultaneously with phase separation. That is, the following can be easily conceived. Even in the case of a eutectic phase diagram like FIG. 4C or 4D between a raw material element or the like and a compound, it is not apparent that such a phase separation process 504 that elements 502 performing surface diffusion form a compound 505 followed by additional agglomeration as in the conceptual view of FIG. 5B will be sequentially caused.

Figure 4C:
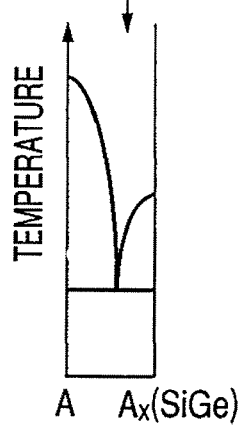
Figure 4D:
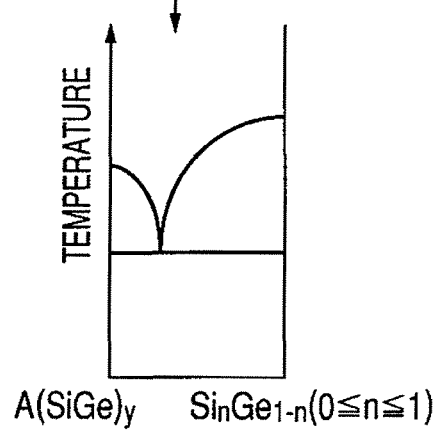

However, the inventors of the present invention have made extensive studies to find that phase separation between a raw material element or the like and a compound thereof as shown in FIG. 4C or 4D can also be achieved by controlling deposition conditions in a non-equilibrium state. Therefore, according to the present invention, a structure having a nano-scale phase-separated structure can be formed by means of many materials that have been conventionally thought to be inapplicable.

The main characteristic of the present invention is a phase-separated structure between $Si_nGe_{1-n}$ (where $0 \leq n \leq 1$) or an element A except both Si and Ge and a compound between the element A and $Si_nGe_{1-n}$ (where $0 \leq n \leq 1$). They may not be the eutectic type over the entire compositional range between constituent elements and the like.

Accordingly, as for applicable materials, the element A is preferably selected from Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, and B.

However, any other element in addition to those described above may be used as the element A as long as the structure of the present invention can be formed of the element. In addition, another element than the above raw materials is preferably added in an amount of 30 atomic % or less. The amount of the element except the above raw materials to be added is more preferably 15 atomic % or less. In particular, the partial addition of a material having a eutectic phase diagram over the entire compositional range with $Si_nGe_{1-n}$ (where $0 \leq n \leq 1$) is also preferably performed. Examples of such material include Al, Zn, Ag, Au, Sb, Sn, and In. The term "addition" refers to a condition where the compositional ratio is lower than that of the compound between the element A and $Si_nGe_{1-n}$ (where $0 \leq n \leq 1$), and compositions can be compared in units of atomic %.

In addition, one of the members of the structure of the present invention is occupied by the compound between the element A and $Si_nGe_{1-n}$ (where $0 \leq n \leq 1$). However, the compound refers to the condition where multiple bonds are present between $Si_nGe_{1-n}$ (where $0 \leq n \leq 1$) and the element A, and is not necessarily crystallized. In particular, an amorphous state is also preferable in terms of application.

For example, a system composed of palladium and $Si_nGe_{1-n}$ (where $0 \leq n \leq 1$) has a eutectic phase diagram as shown in FIG. 4D between a compound comprised of Pd and $Si_nGe_{1-n}$ (where $0 \leq n \leq 1$) (that is, $A(SiGe)_y$, where A represents Pd; y will be described later) and $Si_nGe_{1-n}$ (where $0 \leq n \leq 1$). In this case, the structure of the present invention can be formed. When the structure is present as a compound between Pd and $Si_nGe_{1-n}$ (where $0 \leq n \leq 1$), a separation structure may be formed not only as the crystal of the compound but also as an amorphous substance.

Therefore, even when only $Si_nGe_{1-n}$ (where $0 \leq n \leq 1$) is etched, a compound between Pd and $Si_nGe_{1-n}$ (where $0 \leq n \leq 1$) in an amorphous state may be etched owing to the presence of plural dangling bonds of Si or Ge even though a crystalline compound between Pd and $Si_nGe_{1-n}$ (where $0 \leq n \leq 1$) is not etched. In this case, Si or Ge having a weak bond may be etched, so one having a high Pd composition may remain. As described above, in the present invention, when one of the members constituting a structure is removed, the other member may be slightly corroded.

The composition with respect to the element A that can be selected in the present invention cannot be uniformly represented because the compound between the element A and $Si_nGe_{1-n}$ (where $0 \leq n \leq 1$) may take various states depending on materials. However, an element that can be taken to have a phase diagram shown in FIG. 4C or 4D out of such phase diagram as shown in FIG. 4B is effective. The value x of $A_x(SiGe)$ in which the element A accounts for the majority as shown in FIG. 4C and the value y of $A(SiGe)_y$ in which $Si_nGe_{1-n}$ (where $0 \leq n \leq 1$) accounts for the majority as shown in FIG. 4D are inherent for the material. However, the compositional range is determined once the values x and y are determined. For example, in the case of $A_x(SiGe)$, the composition range [atomic %] of A with respect to the total amount of A and $Si_nGe_{1-n}$ (where $0 \leq n \leq 1$) is preferably selected from the range of $(100x+10)/(x+1)$ to $(100x+90)/(x+1)$ (both inclusive). It should be noted that the composition range shown here is the minimum requirement because whether the structure of the present invention is formed in the composition range depends on production conditions. Therefore, that it is the structure of the present invention is determined on the basis of the conditions that it falls within the composition range and that the above-described ratio of the average diameter Dl in the major axis direction to the average diameter Ds in the minor axis direction of columnar members is less than 5. Furthermore, in the case of $A(SiGe)_y$, the composition range of A with respect to the total amount of A and $Si_nGe_{1-n}$ (where $0 \leq n \leq 1$) is preferably selected from the range of $10y/(y+1)$ to $90y/(y+1)$ (both inclusive). The expression "$A_x(SiGe)$" represents the composition ratio at which X A's are present per one $Si_nGe_{1-n}$ (where $0 \leq n \leq 1$). The same holds true for $A(SiGe)_y$. For example, supposing the above-described system composed of a compound comprised of Pd and $Si_nGe_{1-n}$ (where $0 \leq n \leq 1$) and $Si_nGe_{1-n}$ (where $0 \leq n \leq 1$), the compound between Pd and $Si_nGe_{1-n}$ (where $0 \leq n \leq 1$) is of the $A(SiGe)_y$ type (where y=1). In other words, the compound is formed when A and $Si_nGe_{1-n}$ (where $0 \leq n \leq 1$) are used at an amount ratio of 1:1. The composition range of A at this time is preferably selected from the range of $10y/(y+1)$ to $90y/(y+1)$ (both inclusive), that is, from the range of 5 atomic % to 45 atomic % (both inclusive) obtained by substituting y=1 into the preceding expression. This is valid also for the case where y=1 for the compound system between Pd and $Si_nGe_{1-n}$ (where $0 \leq n \leq 1$). For example, if y=2, the range is from 6.667 atomic % to 60 atomic % (both inclusive).

$Si_nGe_{1-n}$ (where $0 \leq n \leq 1$) described above represents the composition of Si and Ge. Si composition is represented by 100n [atomic %] while Ge composition is represented by 100(1−n) [atomic %]. On the other hand, $A_x(SiGe)$ represents only the ratio between A and $Si_nGe_{1-n}$ (where $0 \leq n \leq 1$). When the ratio is represented in terms of composition, A composition is represented by $100x/(x+1)$ [atomic %], and $Si_nGe_{1-n}$ (where $0 \leq n \leq 1$) composition is represented by $100/(x+1)$ [atomic %].

The conditions under which the structure of the present invention is formed are not uniform, and are inherent for a material to be selected. The inventors of the present invention have made extensive studies to find a certain correlation. Table 1 and Table 2 below each show the correlation.

TABLE 1

| Material | Eutectic temperature [° C.] | Average diameter of columnar members [nm] |
|---|---|---|
| $Cu_3Si$—Si | 800 | 7 |
| PdSi—Si | 860 | 5 |
| NiSi—Si | 980 | 2.5 |
| $CoSi_2$—Si | 1258 | 2 |

TABLE 1-continued

| Material | Eutectic temperature [° C.] | Average diameter of columnar members [nm] |
|---|---|---|
| $TiSi_2$—Si | 1330 | 0 |
| $WSi_2$—Si | 1400 | 0 |

TABLE 2

| Material | Eutectic temperature [° C.] | Average diameter of columnar members [nm] |
|---|---|---|
| $Cu_3Ge$—Ge | 642 | 7 |
| PdGe—Ge | 728 | 4.5 |
| NiGe—Ge | 762 | 3.5 |
| $TiGe_2$—Ge | 900 | 0 |

Table 1 and Table 2 above show the eutectic temperatures [° C.] of several main materials selected in phase diagrams. The temperature of the substrate 104 is set to room temperature, and the average diameter [nm] of the columnar members of a structure produced by means of a sputtering method without, for example, any application of a bias voltage to the substrate 104 is shown together. The other conditions are as follows: argon having a pressure of 0.1 Pa is used as a process gas, and electric power to be input to a 4-inch-size target is 120 W for a Si system or 60 W for a Ge system. Attention is paid for establishing a situation where the composition is such that the upper end face of a columnar member is substantially of a circular shape. Therefore, the average diameter is shown without distinguishing the major and minor axis directions. In addition, the eutectic temperature is shown with reference to the general equilibrium diagram of bulk. In this case, however, some degree of error in the eutectic temperature has substantially no influence on the correlation found by the inventors of the present invention.

As can be seen from Table 1 and Table 2, the average diameter of columnar members reduces with increasing eutectic temperatures, and the structure of the present invention is not formed at a certain temperature. The correlation between the eutectic temperature and the average diameter of columnar members may be formulated roughly (to a first approximation) on the basis of four sets of data to form the structure of the present invention out of the above result. Irrespective of material selected, what eutectic temperature of a material can be selected for a desired average diameter of columnar members can be understood. For a Si system, the following expression [1] is valid.

[Eutectic temperature ° C.]=1,280° C.−75×[Average diameter (nm) of columnar members]    [1]

For a Ge system, the following expression [2] is valid.

[Eutectic temperature ° C.]=897° C.−37×[Average diameter (nm) of columnar members]    [2]

Attention should be paid to the implication of the expressions [1] and [2] that a structure cannot be formed with a system in which the average diameter of columnar members is 0, in other words, with a Si system having a eutectic temperature of about 1,280° C. or higher, or a Ge system having a eutectic temperature of about 897° C. or higher. However, this is because the conditions under which a structure is formed are fixed as described above. 1,280° C. in the case of a Si system or 897° C. in the case of a Ge system in the above correlation is additionally increased by additionally increasing the temperature of the substrate 104 or by promoting the diffusion of elements on the substrate surface 503 through, for example, the application of a bias voltage to the substrate 104. The examples shown here are for each of a Si system and a Ge system; likewise, a SiGe system shows a similar tendency.

The expression [1] showing a correlation in a Si system and the expression [2] showing a correlation in a Ge system differ largely from each other. This is attributable to the circumstance that the deposition rate of the Ge system is high because the sputtering yield of Ge (the probability of causing Ge to sputter with respect to one process gas [an Ar gas in this case]) is much higher than that of Si. When the deposition rates of both systems are set to be equal to each other, the correlation in the Si system, the correlation in the Ge system, and a correlation in a SiGe system can be represented by means of one formula without any discrimination. In the above sputtering, input power (RF power) for the Si system is set to 120 W and the power for the Ge system is set to 60 W so that the deposition rates of both systems come closer to each other. Even in this case, however, the deposition rate of the Ge system is still higher than that of the Si system.

Description will be given of a PdSi system as a reference. The average diameter of the columnar members of a structure to be formed can be changed with a substrate temperature as shown in Table 3 below.

TABLE 3

| Material | Substrate temperature [° C.] | Average diameter of columnar members [nm] |
|---|---|---|
| PdSi—Si | 25 | 5 |
|  | 200 | 6 |
|  | 300 | 7.2 |

In this case, the correlation represented by the following expression [3] can be obtained.

[Substrate temperature ° C.]=575+124×[Average diameter (nm) of columnar members]   [3]

As described above, a structure having a columnar member having a desired size in a nano-scale region can be formed by finding a unified correlation not only for a specific material.

Therefore, the present invention provides a nano-scale structure having an extremely effective phase-separated structure and a method of producing the same on the basis of the finding that a structure having a phase-separated structure formed therein can be formed even when involving the formation of the compound, and of the finding of the correlation nearly irrespective of materials.

In addition, selecting appropriate composition for the structure of the present invention can bring the above-described ratio between average diameters limitlessly closer to 1 and can reduce fluctuations in diameters of plural columnar members. This is because a eutectic phase diagram is obtained over a wide temperature range in an equilibrium diagram as shown in FIG. 4, in other words, because separation occurs at only one eutectic temperature present in a process for forming a phase-separated structure. Therefore, it can be easily assumed that phase separation is repeated several times in a phase diagram where plural phase separations are present, thereby resulting in a complex structure.

[Porous Structure, Needle-Like Structure, and Methods of Producing the Same]

The porous structure, needle-like structure, and methods of producing the same of the present invention will be described.

Figure 6A:
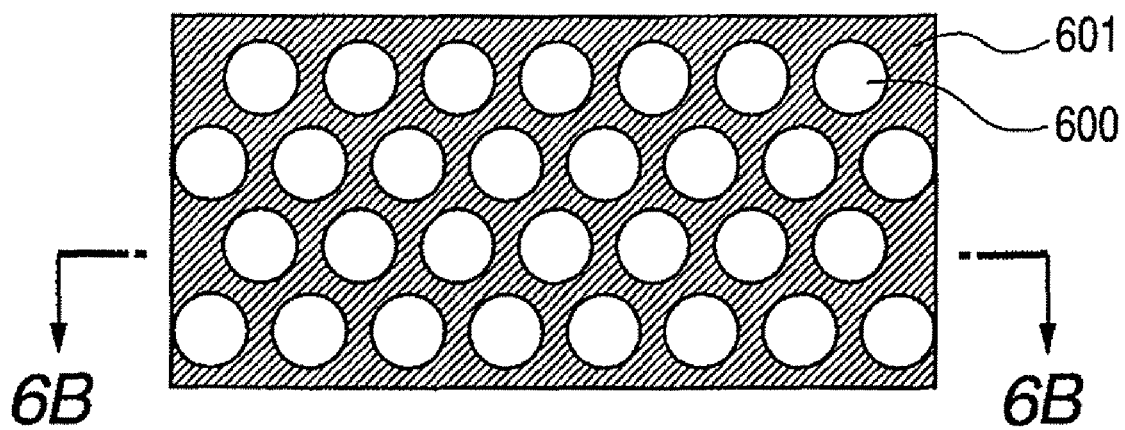
FIGS. 6A and 6B are schematic views each showing a porous structure of the present invention.
Figure 6B:
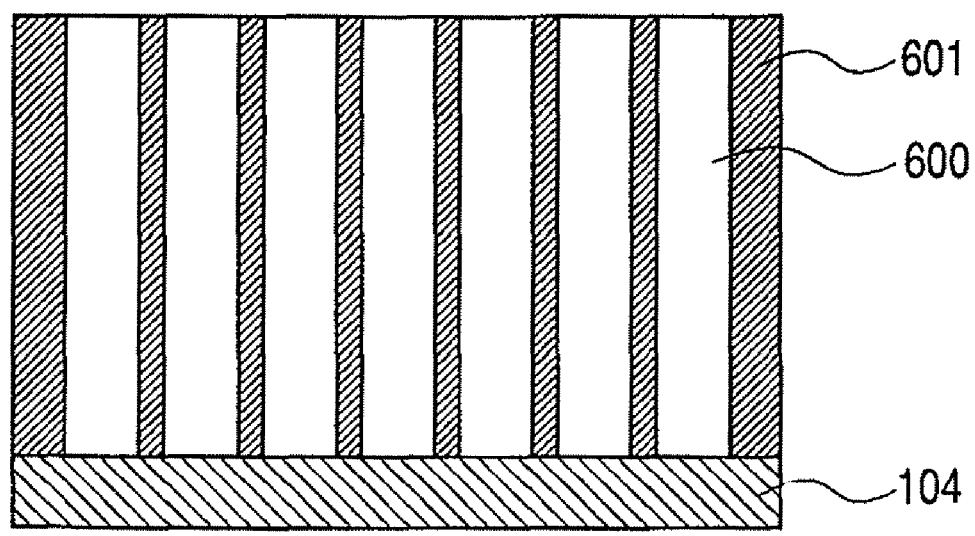
Figure 7A:
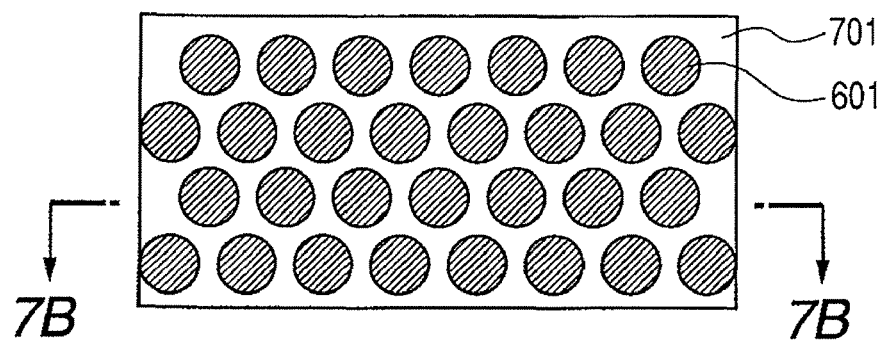
FIGS. 7A and 7B are schematic views each showing a needle-like structure of the present invention.
Figure 7B:
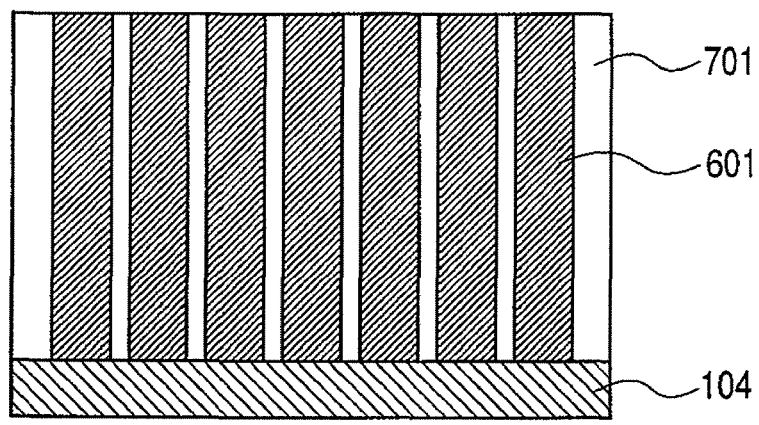

As shown in FIGS. 6A (a plan view) and 6B (a sectional view taken along the line 6B-6B of FIG. 6A), a porous structure that can be formed by removing only columnar member portions from the structure of the present invention having the above phase-separated structure is composed of plural fine pores 600 and a matrix portion 601 composed of a first member or second member. The fine pores 600 are characterized in that they extend substantially perpendicularly with respect to the substrate 104, and that they are excellent in linearity. In addition, as shown in FIGS. 7A (a plan view) and 7B (a sectional view taken along the line 7B-7B of FIG. 7A), a needle-like structure that can be formed by removing a portion except columnar members from the structure of the present invention having the above phase-separated structure is composed of plural needle-like portions 601 composed of the first member or second member and a void portion 701 between the needle-like portions. The needle-like portions are characterized in that they extend substantially perpendicularly with respect to the substrate 104, and that they are excellent in linearity.

An etching method with selectivity such as chemical wet etching, vapor phase etching, or plasma assist etching can be used as a method of removing only columnar member portions or a portion except columnar members upon production of the above porous structure or needle-like structure. The structure of the present invention having the above phase-separated structure, the structure serving as a starting point, is constituted by a portion composed of a compound between the element A and $Si_nGe_{1-n}$ (where $0 \leq n \leq 1$) and a portion composed of $Si_nGe_{1-n}$ (where $0 \leq n \leq 1$). In such case, the chemical etching enables only $Si_nGe_{1-n}$ (where $0 \leq n \leq 1$) to be etched by means of an etching solution such as an aqueous solution of KOH in a heated state. In addition, the use of an etching gas such as $XeF_2$ with which only Si can be etched is effective for the vapor phase etching in the case where $Si_nGe_{1-n}$ (where $0 \leq n \leq 1$) has a low Ge composition or is free of Ge. In particular, etching with $XeF_2$ allows etching at a high aspect ratio making use of its high selectivity in spite of the fact that the diameter of each of the columnar members of the structure of the present invention, or an interval between columnar members is of a nanometer size. Furthermore, no assist with plasma or the like is needed, a portion except a portion to be etched is damaged little, and a resist or the like receives no damage. Therefore, a process based on the combination of self-organization film and photolithography can be smoothly performed. In the case where $Si_nGe_{1-n}$ (where $0 \leq n \leq 1$) has a high Ge composition, it is also preferable to etch Ge or SiGe by means of hydrogen peroxide. Alternatively, the structure of the present invention having the above phase-separated structure and serving as a starting point may be constituted by a portion composed of a compound between the element A and $Si_nGe_{1-n}$ (where $0 \leq n \leq 1$) and a portion composed of the element A. In such case, particularly when the element A is a metal, the chemical etching is extremely effective in consideration of the high chemical resistance of the compound between the element A and $Si_nGe_{1-n}$ (where $0 \leq n \leq 1$). In particular, when the element A is readily soluble in an acid or an alkali, the porous structure or needle-like structure of the present invention can be quickly obtained. When electricity can be caused to flow into the structure, part of the structure can be dissolved acceleratedly by arranging the structure on an anode side in an acid aqueous solution and applying a voltage. Finally, a portion except a portion to be etched may be subjected to oxidation due to, for example, the adsorption of oxygen to its surface in the process for obtaining each of those porous structure and needle-like structure.

In particular, the application of a voltage is a preferable means for active oxidation because the application promotes oxidation.

Constituent elements of which the porous structure or needle-like structure of the present invention is formed preferably include Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, or B. Furthermore, the constituent elements of which the porous structure or needle-like structure is formed may include Al, Zn, Ag, Au, Sb, Sn, In, or the like which is applicable as the above-described additional element; provided that each of these additional elements is preferably added in a range in which the element forms a solid solution with any one of the above constituent elements.

[Electronic Device Utilizing the Present Invention]

The term "electronic device" as used herein refers to, for example, a quantum dot, a quantum wire, a quantum wire transistor, a single electronic transistor, or a single electronic memory. The term also includes an information processing system using any such device.

In particular, the structure of the present invention is composed of a compound between the element A and $Si_nGe_{1-n}$ (where $0 \leq n \leq 1$) and $Si_nGe_{1-n}$ (where $0 \leq n \leq 1$) or the element A.

Figure 14:
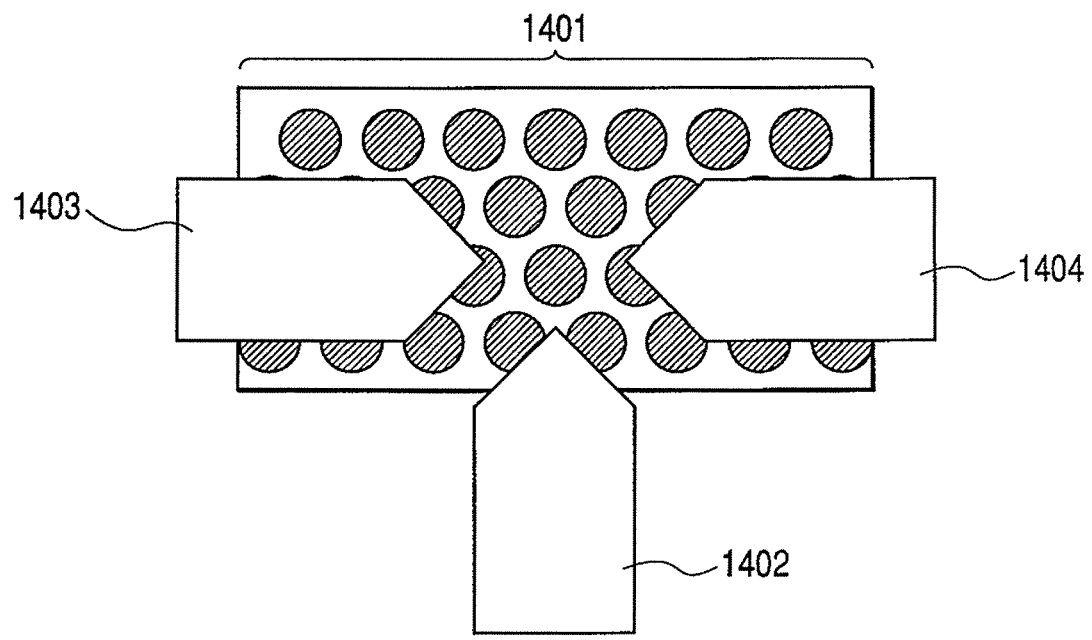
FIG. 14 is a conceptual view showing an example of an electronic device using the structure of the present invention.

Therefore, columnar members can be formed of a material called an environmental semiconductor such as a compound between Fe, Ca, Sr, Mg, Ba, or the like and $Si_nGe_{1-n}$ (where $0 \leq n \leq 1$). Adding a trace element to the columnar members to control conductivity can result in a wire-like electronic device. Such cases include the case where light is emitted in accordance with each band gap. In addition, a transistor shown in FIG. 14 is permitted for what is called a quantum dot or a quantum wire. In other words, a structure 1401 of the present invention can be made into a transistor which has a source electrode 1403 and a drain electrode 1404 and which controls the movement of an electron by means of a gate electrode 1402. In addition, as described below, it is also preferable to produce an electronic device by forming an electrode portion on the structure of the present invention as shown in FIG. 15.

[Gate Electrode Utilizing the Present Invention]

As shown on the upper side of FIG. 15, a conventional transistor is constituted by a source electrode 1501, a drain electrode 1502, a gate oxide film 1505, a spacer 1504, a gate electrode portion 1503, and a silicide 1506. In contrast, as shown on the lower side of FIG. 15, when the portion that has been conventionally the silicide 1506 is replaced with a structure portion 1507 of the present invention, the gate electrode portion 1503 of the present invention causes the anisotropy of a material due to a columnar structure of the structure to reduce leak current. As a result, a transistor or, finally, an integrated circuit having small power consumption can be produced. The columnar member is constituted by, for example, a compound between Ti, Co, Mo, or V and $Si_nGe_{1-n}$ (where $0 \leq n \leq 1$) because the compound is excellent in electric conductivity. The present invention includes an integrated circuit using the gate electrode and an information processing system mounted with the integrated circuit as well.

[Magnetic Recording Medium, Magnetic Recording/Reproducing Device, and Information Processing System Each Utilizing the Present Invention]

Figure 8:
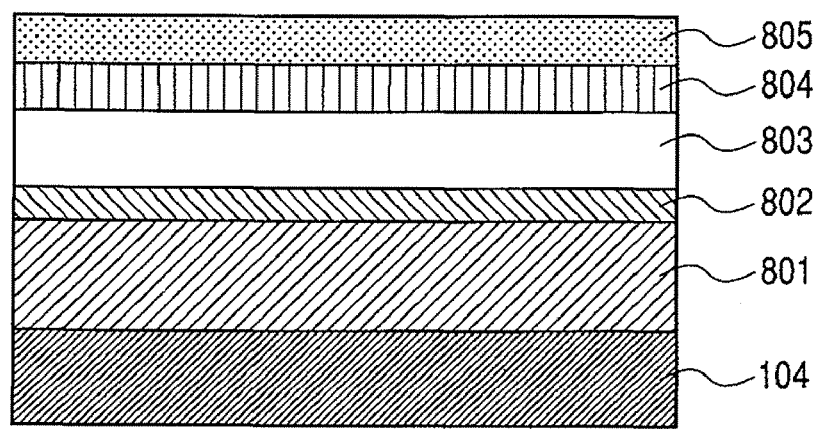
FIG. 8 is a schematic view showing the layer constitution of a magnetic recording medium.

The layer constitution of a magnetic recording medium for explaining a magnetic recording medium of the present invention will be described with reference to FIG. 8. The magnetic recording medium has a soft magnetic layer 801 formed on the substrate 104 in such a manner that a magnetic flux from a magnetic head converges on a recording layer 803; an underlayer 802 intended for controlling, for example, the structure of the recording layer or the orientation of a crystal; and the recording layer 803 formed through the layer 802. A protective layer 804 and a lubricant layer 805 are preferably formed sequentially for the prevention of the deterioration of the medium, and floating stability and impact resistance of the head. It should be noted that this layer constitution is a minimum requirement, and one or more layers may be appropriately inserted between two adjacent layers.

Figure 9A:
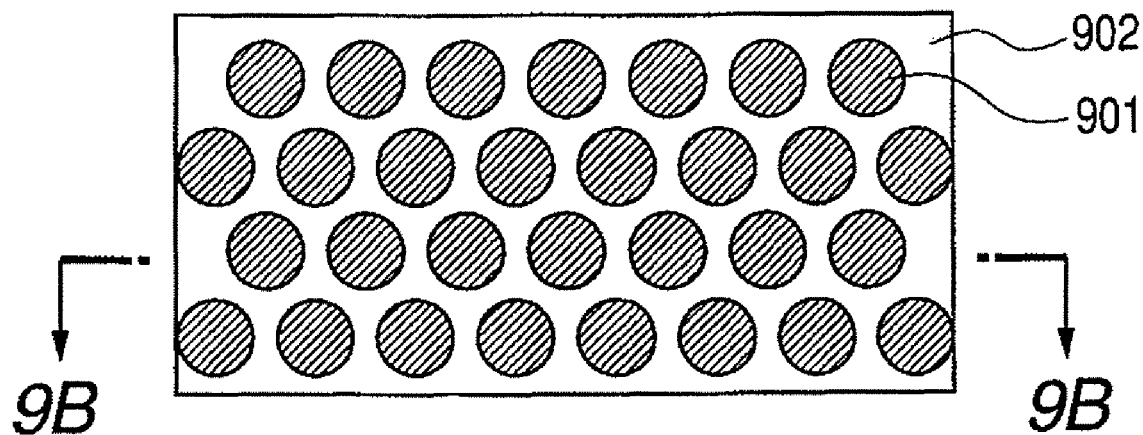
FIGS. 9A and 9B are schematic views each showing an example of a magnetic recording medium using the structure of the present invention.
Figure 9B:
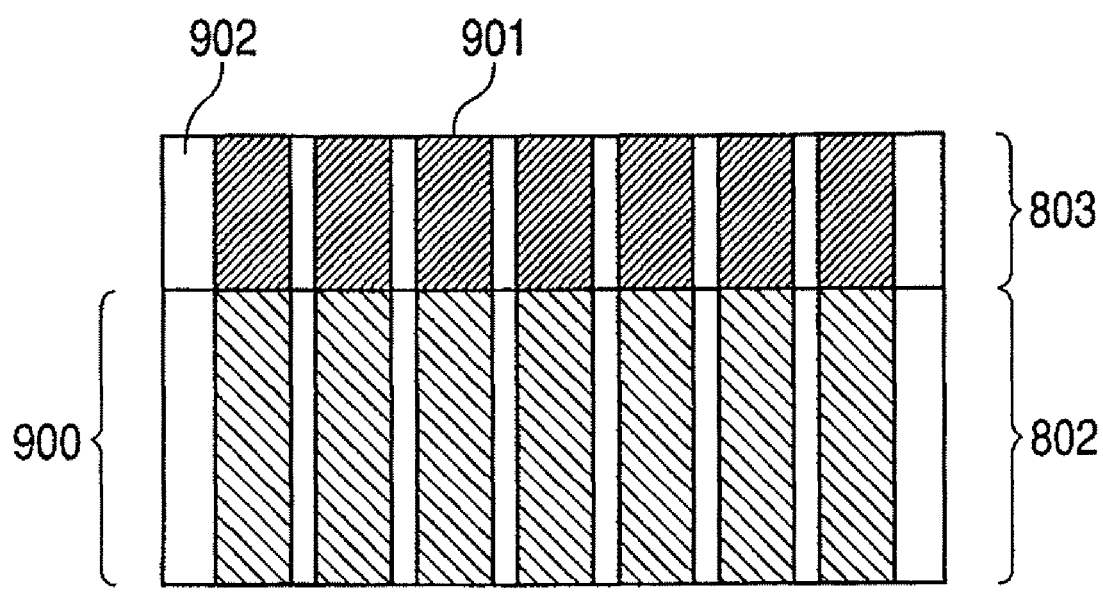

A first invention in the magnetic recording medium of the present invention is characterized in that there is provided a structure in which magnetic particles of the recording layer 803 are connected to the respective columnar members dispersed in a self-organization manner into the structure of the present invention as the underlayer 802. This structure will be explained with reference to FIGS. 9A (a plan view) and 9B (a sectional view taken along the line 9B-9B of FIG. 9A). This structure is characterized in that a layer (film) composed of the structure of the present invention is applied as the underlayer 802, and hard magnetic particles 901 in the recording layer 803 are continuously connected to the respective columnar members of the structure. The magnetic recording medium is characterized in that a region except the columnar member portions of a layer 900 composed of the structure of the present invention is continuously connected to a non-magnetic region 902 in the recording layer 803. The present invention is characterized in that, the nucleus formation of the hard magnetic particles 901 can be caused quickly by the columnar members of the underlayer at an initial stage of the formation of the recording layer 803 containing the hard magnetic particles 901.

The constituent element A of the structure of the present invention of which the underlayer is formed preferably contains Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, or B. Furthermore, a chemical vapor deposition method, a sputtering method, an evaporation method, a plating method, or the like is a preferable method of forming the recording layer 803. A deposition method in a vapor phase such as the sputtering method is particularly preferable.

A CoCr, CoCrPt, CoCrPtB, CoCrPtTa, CoPt—MgO, FePt—MgO, CoPt—SiO$_2$, FePt—SiO$_2$, CoCrPt—SiO$_2$, Co/Pt-based, Fe/Pt-based, Co/Pd-based, or Fe/Pd-based multilayer film or the like having appropriate compositions is preferably selected as a material for the recording layer 803.

Any other material is applicable as long as a deposition method in a vapor phase such as a sputtering method is applicable to the material. In addition, the columnar members of the structure of the present invention are preferably arranged in a honeycomb fashion in a self-organization manner on the surface of the underlayer 802. As a result, variances of the particle sizes of the hard magnetic particles 901 having an average diameter of 20 nm or less can be reduced. As a result, a magnetic recording medium with an extremely low-noise can be provided. This is attributable to the effectiveness of the characteristic that the variance of the average diameter of the columnar members in the structure of the present invention is extremely small. The term "honeycomb arrangement" as used herein refers to an arrangement in a certain region, and permits arrangement disorder between different regions.

Figure 10A:
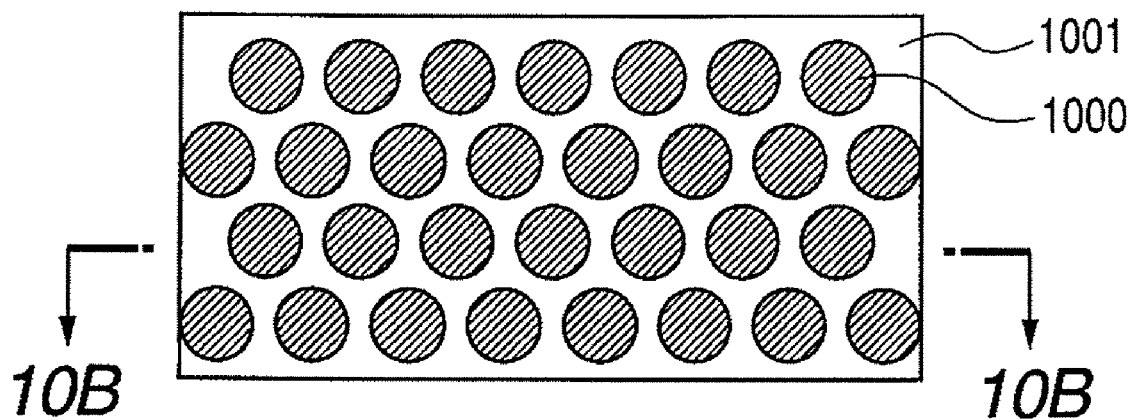
FIGS. 10A and 10B are schematic views each showing an example of a recording layer using the porous structure of the present invention.
Figure 10B:
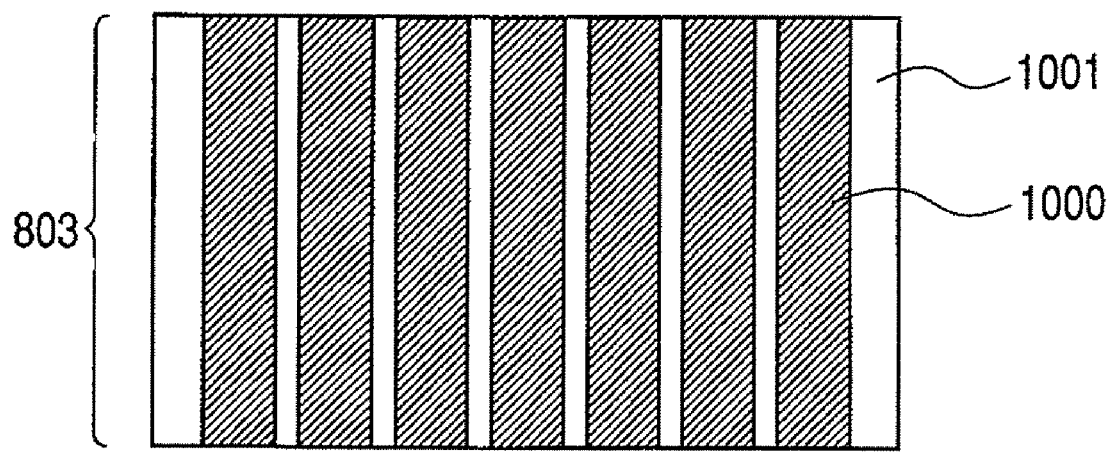

Next, a second invention of the magnetic recording medium of the present invention is a magnetic recording medium having a recording layer obtained by removing only columnar member portions of the structure of the present invention and filling the resultant with a hard magnetic material. This case is similar to the case where the fine pores of the porous structure of the present invention are filled with a hard magnetic material. FIGS. 10A (a plan view) and 10B (a sectional view taken along the line 10B-10B of FIG. 10A) each show the second invention of the magnetic recording medium, and are a schematic view of the recording layer 803. This magnetic recording medium is characterized in that its hard magnetic material has the same shape as that of each of the columnar members of the structure of the present invention. This is because the fine pores 600 of the porous structure obtained by removing only the columnar members from the structure are filled with a hard magnetic material. Therefore, the columnar members are each preferably composed of a hard magnetic material 1000, and a portion except them is preferably a non-magnetic region 1001 composed of a first member or a second member. The first member or the second member refers to the above-described member in the structure of the present invention. The members are respectively a member containing a compound between the element A and $Si_nGe_{1-n}$ (where $0 \leq n \leq 1$) and a member containing $Si_nGe_{1-n}$ (where $0 \leq n \leq 1$) or the element A.

The element A is preferably selected from Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, and B. Although some of those elements may have magnetism depending on composition, none of them can have hard magnetism in a compound between the element and $Si_nGe_{1-n}$ (where $0 \leq n \leq 1$). Therefore, the element can be used in a mode where a member except a columnar member is formed of at least a compound between the element and $Si_nGe_{1-n}$ (where $0 \leq n \leq 1$).

In addition, the hard magnetic material 1000 is preferably selected from a material mainly composed of Co, Fe, MPt (M is composed of one or more of Co, Fe, and Ni) as an $L1_0$ ordered alloy, or $M_3Pt$ (M is composed of one or more of Co, Fe, and Ni) as an $L1_2$ ordered alloy; a multilayer film mainly composed of Co or Fe and Pt or Pd; and the like. The fine pores 600 of the porous structure may be filled with the hard magnetic material by means of any method as long as the material is introduced into the fine pores; provided that a chemical vapor deposition method, a sputtering method, a evaporation method, a plating method, or the like is preferable. When an electroplating method is adopted, the underlayer 802 below the recording layer 803 preferably contains a low-resistance metal.

Figure 11A:
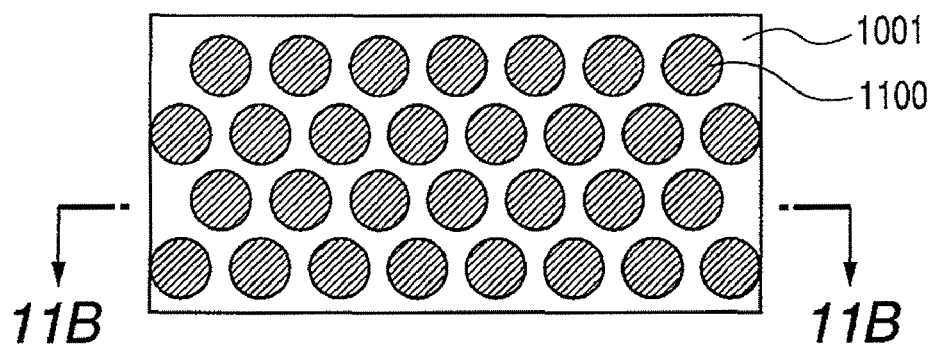
FIGS. 11A and 11B are schematic views each showing an example of a soft magnetic layer using the porous structure of the present invention.
Figure 11B:
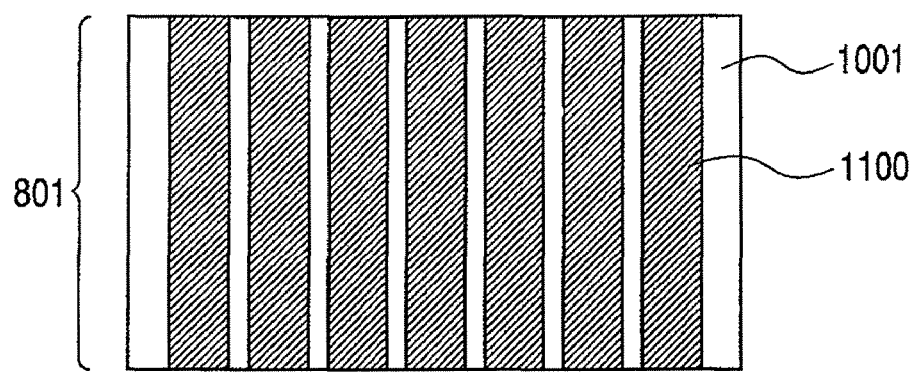

Furthermore, a third invention of the magnetic recording medium of the present invention is a magnetic recording medium having a soft magnetic layer obtained by removing only columnar member portions of the structure of the present invention and filling the resultant with a soft magnetic material. This case is similar to the case where the fine pores of the porous structure of the present invention are filled with a soft magnetic material. FIGS. 11A (a plan view) and 11B (a sectional view taken along the line 11B-11B of FIG. 11A) each show the third invention of the magnetic recording medium, and are a schematic view of the soft magnetic layer 801. This magnetic recording medium is characterized in that its soft magnetic material has the same as that of each of the columnar members of the structure of the present invention. This is because the fine pores 600 of the porous structure obtained by removing only the columnar members from the structure are filled with a soft magnetic material. Therefore, the columnar members are each preferably composed of a soft magnetic material 1100, and a portion except them is preferably a non-magnetic region 1001 composed of a first member or a second member. The first member or the second member refers to the above-described member in the structure of the present invention. The members are respectively a member containing a compound between the element A and $Si_nGe_{1-n}$ (where $0 \leq n \leq 1$) and a member containing $Si_nGe_{1-n}$ (where $0 \leq n \leq 1$) or the element A. The element A is preferably selected from Li, Na, Mg, K, Ca, Sc, Ti, V, Cr, Mn, Fe, Co, Ni, Cu, Rb, Sr, Y, Zr, Nb, Mo, Ru, Rh, Pd, Cs, Ba, La, Hf, Ta, W, Re, Os, Ir, Pt, Ce, Pr, Nd, Sm, Gd, Tb, Dy, Ho, Er, Tm, Yb, Lu, and B. The soft magnetic material 1100 is preferably selected from an alloy having a high magnetic permeability composed of two or more of Co, Fe, and Ni; or mainly composed of $M_3Pt$ (M is composed of one or more of Co, Fe, and Ni) as an $L1_2$ ordered alloy or the like. Although the fine pores 600 of the porous structure may be filled with the soft magnetic material by means of any method as long as the material is introduced into the fine pores, a chemical vapor deposition method, a sputtering method, an evaporation method, a plating method, or the like is preferable. When an electroplating method is adopted, the substrate 104 below the soft magnetic layer 801 preferably contains a low-resistance metal.

Figure 12:
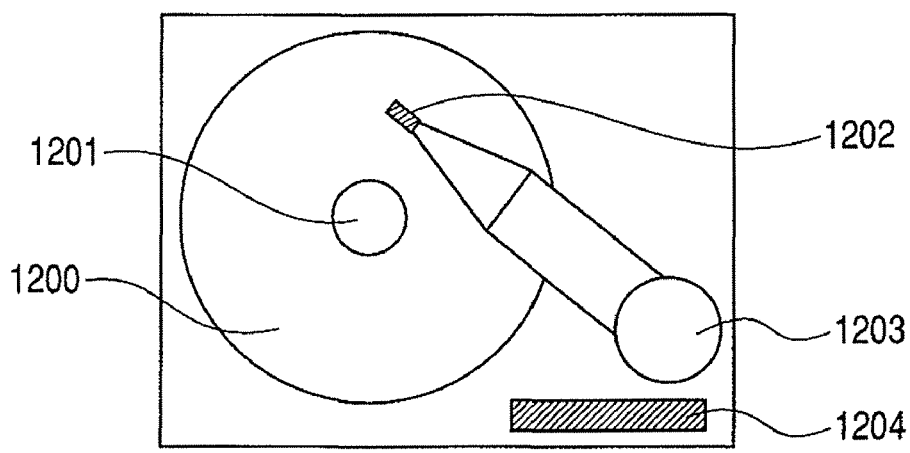
FIG. 12 is a schematic view showing a magnetic recording/reproducing device using a magnetic recording medium of the present invention.

Furthermore, a magnetic recording/reproducing device of the present invention is characterized by using the above-described first, second, and third inventions of the magnetic recording medium of the present invention. As shown in a schematic view shown in FIG. 12, the magnetic recording/reproducing device is constituted by, in a casing, any magnetic recording medium 1200 of the present invention, a magnetic recording medium driving portion 1201 driving the medium, a magnetic head 1202, a magnetic head driving portion 1203, and a signal processing portion 1204. The recording/reproducing mode of the magnetic recording/reproducing device of the present invention is not limited to the rotation of the medium and the driving of the head on an arc as shown in FIG. 12.

Figure 13:
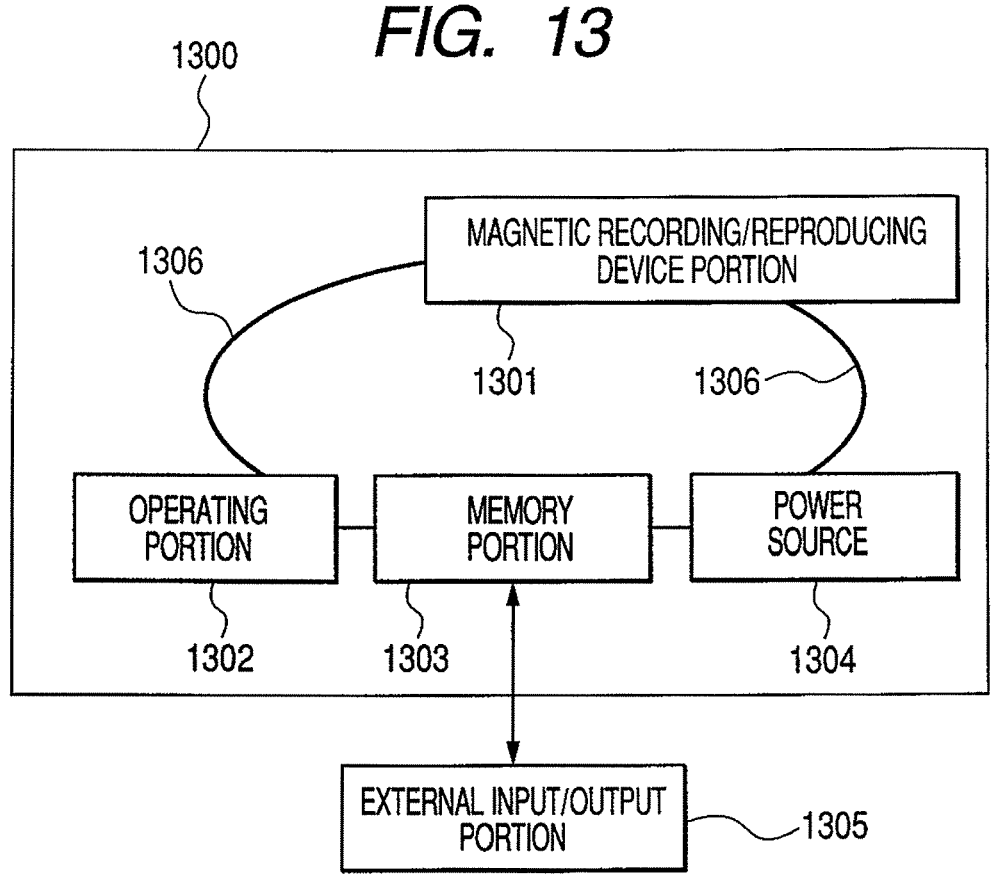
FIG. 13 is a conceptual view of an information processing system using a magnetic recording/reproducing device of the present invention.

An information processing system using the magnetic recording/reproducing device of the present invention will be described. As shown in FIG. 13, the information processing system of the present invention houses, in a housing container 1300, a magnetic recording/reproducing device 1301, an operating portion 1302, a memory portion 1303, and a power source 1304. The information processing system is characterized in that the respective components are connected to one another by means of wiring 1306, and various pieces of information are exchanged through an external input/output portion 1305. In addition, each of the wiring 1306 and the external input/output portion 1305 does not refer to only a wired one, and it is also preferable that each of them be wireless as long as information can be transferred.

[Functional Film Having Catalytic Ability Using Porous Structure and Needle-Like Structure of the Present Invention]

Each of the above-described porous structure and needle-like structure of the present invention has a considerably increased surface area as compared to that of an ordinary film state. In addition, a nano-scale structure is repeated. Therefore, the above-described porous structure and needle-like structure is characterized in that they have many merits because of its nano-scale size unlike a similar structure of a micron size. The same shape of the porous structure of the present invention is realized by means of columnar members having an average diameter of 1 μm with an average interval between centers of gravity of columnar members of 1.3 μm. This shape is compared with an example of the porous structure of the present invention including columnar members having an average diameter of 6 nm with an average interval between centers of gravity of columnar members of 8 nm. The area ratio between side faces of columnar members corresponds to a difference in surface area between the two structures to be compared. When an approximation to assume that a columnar member is of a circular shape is performed, the area of the side face of each columnar member is represented by $\pi Rh$ (where R represents a diameter and h represents a height). When the number of columnar members per unit area is n, the surface area per unit area can be represented by $\pi Rhn$. Therefore, the structures are different in R and n because they are compared with their film thicknesses set to be equal to each other. As a result, the ratio between their R's is 6 [nm]/1,000 [nm], and the ratio between their n's is about $3.0 \times 10^{10}$ [members]/$1.2 \times 10^{6}$ [members] (calculated in terms of 1.3-mm square). Therefore, the product of the ratio between R's and the ratio between n's is 150. This means that the structure of the present invention can have a surface area 150 times as large as that of the micron-scale structure. In view of the foregoing, the structure of the present invention is found to be extremely effective for an approach to effectively utilize surface area, that is, a functional film having catalytic ability. In addition, in a functional film of the present invention, the first member or second member 601 in the porous structure or the first member or second member 601 in the needle-like structure preferably contains a noble metal material having catalytic ability. In particular, such member preferably contains Pd or Pt, or more preferably contains an alloy system of such metal and any other material for reducing the amount of a noble metal to be used. A noble metal exerting desired catalytic ability can be appropriately selected and used. Therefore, in the present invention, a porous structure or needle-like structure composed of Pd or Pt can be formed. Alternatively, a structure mainly composed of PdSi, PtSi, PdGe, PtGe, or the like is also preferable. In this case, the composition range of Pd or Pt with respect to the entire film (porous structure or needle-like structure) is around 50%, so the surface area is increased, owing to the nano-scale, and the amount of a noble metal to be used can be reduced in half. Such catalyst can be used for the efficient generation of hydrogen in a fuel cell or the like. Each of the porous structure and the needle-like structure is particularly preferably integrated with a polymer electrolyte film responsible for proton conductivity. In other words, a constitution shown in each of FIGS. 16 and 17 as schematic views is preferable. In a porous structure, part of an electrolyte film 1601 preferably penetrates along the walls of the fine pores 600 of a noble-metal-containing membrane 1603 to become integrated. In addition, in a needle-like structure, noble-metal-containing rods 1700 are preferably surrounded by part of the electrolyte film 1601 for integration. Such structure can be produced by producing the porous structure or the needle-like structure, applying and pressure-bonding the electrolyte film, and peeling off the resultant from the substrate 104 supporting a structure portion. The fine pores 600 or the noble metal-containing rods 1700 are not needed to be arranged in a complete honeycomb fashion as shown in the figures, and have to be only arranged uniformly.

[Electron Emitting Device Using Structure and Needle-Like Structure of the Present Invention]

An electron emitting device of the present invention is obtained by providing the structure of the present invention with a lead-out electrode. Since the structure of the present invention has a nano-scale phase-separated structure, an electric field concentrates on each columnar member having a low resistance, so an electron emitting device having a reduced threshold can be formed. Preferably, an electron emitting device in which a side face as well as the outermost surface are involved can be formed by removing a portion except the columnar members in the structure of the present invention.

As shown in schematic views of FIG. 18, a lead-out electrode 1803 having an opening including plural columnar members to serve as electron emitting portions 1801 is formed so as to be apart from the electron emitting portions 1801 by an insulation layer 1802. A voltage is applied by a bias applying circuit 1805 between an underelectrode 1800 placed below the electron emitting portions 1801 and the lead-out electrode 1803. As a result, electrons drawn from the electron emitting portions 1801 are emitted in an electron emission direction.

Figure 19A:
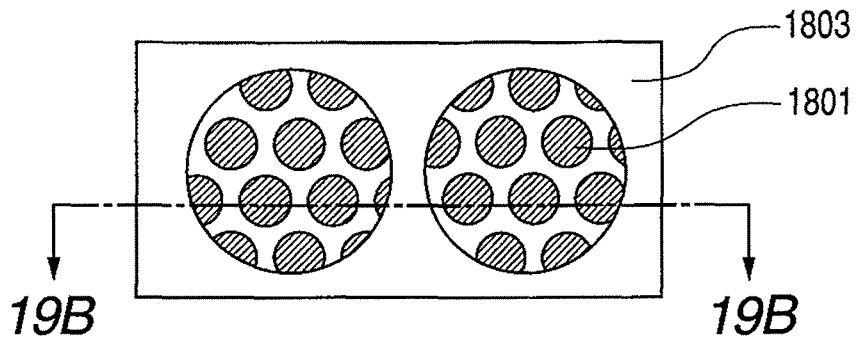
FIGS. 19A and 19B are conceptual views each showing an electron emitting device using the needle-like structure of the present invention.
Figure 19B:
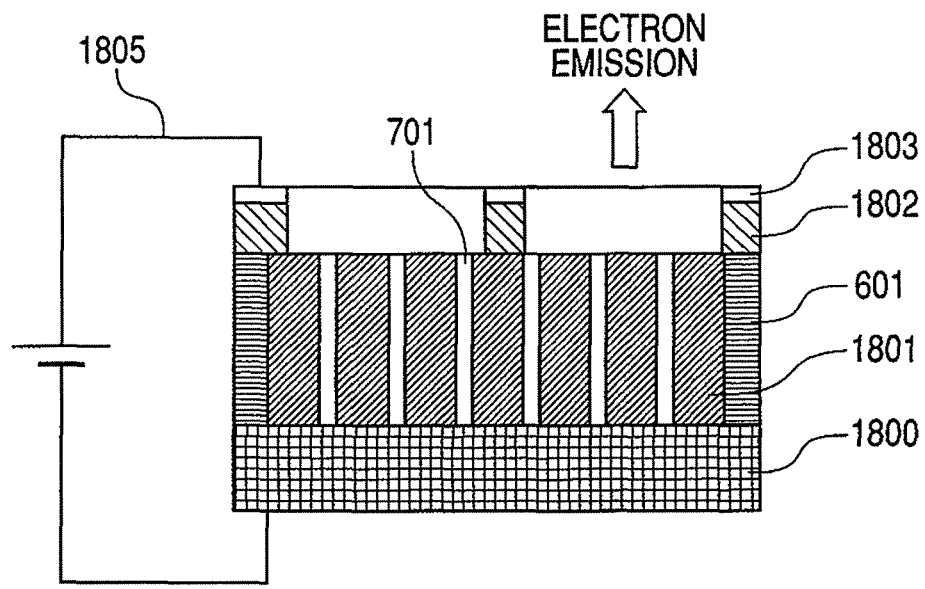

One shown in schematic views of FIG. 19 is also available depending on the insulating property of a material between columnar members in the present invention. In other words, the void portion 701 is preferably formed by removing only part of the first member or second member 601 except a columnar member portion, the part corresponding to the opening provided for the lead-out electrode 1803. In this case, when a voltage is applied by the bias applying circuit 1805 between the electron emitting portions 1801 and the lead-out electrode 1803 via the underelectrode 1800, electrons are emitted in the electron emission direction. Therefore, an electron emitting device having high electron emission efficiency can be formed.

The mode of the electron emitting device is not limited to those shown in FIGS. 18 and 19. In particular, a structure in which a bias is applied to the space between columnar members which is one phase of the structure of the present invention to emit an electron is also preferable. An electron emitting device similar to this can be obtained also by means of the needle-like structure of the present invention having the void portion 701. Furthermore, it is also preferable to coat the surface of each of the electron emitting portions 1801 in the above electron emitting device with a thin layer of carbon.

The above-described invention of an electron emitting device includes an image display device obtained by arranging a large number of such devices.

EXAMPLE 1

This example relates to the formation of the structure of the present invention.

A structure belonging to the scope of the present invention is composed of a binary system mainly composed of $Si_nGe_{1-n}$ (where $0 \leq n \leq 1$) and an element A, and may contain further components. In this example, a PdSi—Si system, a PdGe—Ge system, and a PdSiGe—SiGe system will be taken, and their structures will be described.

At first, as shown in FIG. 20, one 12-mm square Pd metal piece is arranged at a center on a Si sputtering target, and a Ge substrate is selected as the substrate 104. The distance between the target and the substrate is about 80 mm, and the substrate is arranged directly above the target. Film formation is performed for 5 minutes under the following deposition conditions: the temperature of the substrate is room temperature, no DC bias is applied to the substrate, input electric power is RF 120 W, and an argon gas pressure is 0.1 Pa.

Similarly, two 12-mm square Pd metal pieces are arranged at a center on a Ge sputtering target, and a Si substrate is selected as the substrate 104. The distance between the target and the substrate is about 80 mm, and the substrate is arranged directly above the target. Film formation is performed for 5 minutes under the following deposition conditions: the temperature of the substrate is room temperature, no DC bias is applied to the substrate, input electric power is RF 60 W, and an argon gas pressure is 0.1 Pa.

Then, the surface structures and sectional structures of the films formed on those substrates are observed with a scanning electron microscope.

As a result, in the PdSi—Si system, a surface structure which is of a circular shape and which is composed of columnar PdSi portions having an average diameter of about 3 nm and a Si portion surrounding the PdSi portions is observed on the Ge substrate. Furthermore, the sectional observation confirms that the PdSi portions have columnar structures extending perpendicularly from a substrate surface in the direction in which the film is deposited. The analysis of the composition of each of Si and Pd with X-ray fluorescence measurements shows that Pd accounts for about 12 atomic % in this case. In addition, the film thickness is about 40 nm.

In the PdGe—Ge system, a surface structure which is of a circular shape and which is composed of columnar PdGe portions having an average diameter of about 4.5 nm and a Ge portion surrounding the PdGe portions is observed on the Si substrate. Furthermore, the sectional observation confirms that the PdGe portions have columnar structures extending perpendicularly from a substrate surface in the direction in which the film is deposited. The analysis of the composition of each of Ge and Pd with X-ray fluorescence measurements shows that Pd accounts for about 15 atomic % in this case. In addition, the film thickness is about 50 nm.

Film formation is performed on the PdSi—Si system under the same deposition conditions by arranging three 12-mm square Pd metal pieces on the Si sputtering target. The film thus obtained has a surface structure which is of a circular shape and which is composed of columnar Si portions having an average diameter of about 3 nm and a PdSi portion surrounding the Si portions. Furthermore, the sectional observation confirms that the Si portions have columnar structures extending perpendicularly from a substrate surface in the direction in which the film is deposited. The analysis of the composition of each of Si and Pd with X-ray fluorescence measurements shows that Pd accounts for about 37 atomic % in this case. In addition, the film thickness is about 45 nm.

Film formation is performed on the PdGe—Ge system under the same deposition conditions by arranging four 12-mm square Pd metal pieces on the Ge sputtering target. The film thus obtained has a surface structure which is of a circular shape and which is composed of columnar Ge portions having an average diameter of about 4.5 nm and a PdGe portion surrounding the Ge portions. Furthermore, the sectional observation confirms that the Ge portions have columnar structures extending perpendicularly from a substrate surface in the direction in which the film is deposited. The analysis of the composition of each of Ge and Pd with X-ray fluorescence measurements shows that Pd accounts for about 35 atomic % in this case. In addition, the film thickness is about 50 nm.

Furthermore, film formation is performed by arranging one 12-mm square Pd metal piece and one 10-mm square Ge metal piece on the Si sputtering target at an input electric power of RF 100 W. A MgO substrate is used as a substrate. The film thus obtained has a surface structure which is of a circular shape and which is composed of columnar PdSiGe portions having an average diameter of about a little under 3 nm and a SiGe portion surrounding the PdSiGe portions. Furthermore, the sectional observation confirms that the PdSiGe portions have columnar structures extending perpendicularly from a substrate surface in the direction in which the film is deposited. The analysis of the composition of each of SiGe and Pd with X-ray fluorescence measurements shows that Pd accounts for about 10 atomic % in this case. In addition, the film thickness is about 45 nm. As described above, the formation of the structure of the present invention is confirmed even in the PdSiGe—SiGe system as in the case of each of the PdSi—Si system and the PdGe—Ge system.

Film formation is performed by arranging three 12-mm square Pd metal pieces and one 10-mm square Ge metal piece on the Si sputtering target at an input electric power of RF 100 W. An MgO substrate is used as a substrate. The film thus obtained has a surface structure which is of a circular shape and which is composed of columnar SiGe portions having an average diameter of about a little under 3 nm and an PdSiGe portion surrounding the SiGe portions. Furthermore, the sectional observation confirms that the SiGe portions have columnar structures extending perpendicularly from a substrate surface in the direction in which the film is deposited. The analysis of the composition of each of SiGe and Pd with X-ray fluorescence measurements shows that Pd accounts for about 39 atomic % in this case. In addition, the film thickness is about 50 nm. As described above, the formation of the structure of the present invention is confirmed even in the PdSiGe—SiGe system as in the case of each of the PdSi—Si system and the PdGe—Ge system.

The foregoing description shows the following. As shown in FIG. 1 as schematic views each showing the structure of the present invention, a change in composition can achieve either one of the first combination 103 in which the compound (PdSi, PdGe, or PdSiGe in this example) between the element A and $Si_nGe_{1-n}$ (where $0 \leq n \leq 1$) is columnar members, and $Si_nGe_{1-n}$ (where $0 \leq n \leq 1$) (Si, Ge, or SiGe in this example) or the element A is a member surrounding the columnar members; and the second combination 102 in which the constituent elements of the respective members in the first combination 103 are replaced with each other.

EXAMPLE 2

This example relates to means for determining whether a structure to be obtained is within the scope of the present invention.

Determination is performed in accordance with the flow chart shown in FIG. 2 by means of a scanning electron micrograph of the structure described in Example 1 having PdSi columnar structures with an average diameter of about 3 nm as one example.

It should be noted that an image obtained by binarizing the above image corresponds to an image shown on the left in (b) of FIG. 2. In addition, the average diameter Dl in the major axis direction and the average diameter Ds in the minor axis direction are calculated from the binarized image in accordance with (c-1). As a result, each of the average diameters Dl and Ds is found to be about 3 nm. Therefore, the ratio Dl/Ds is calculated to be 1. Since the calculated value satisfies the condition that Dl/Ds is less than 5 as defined in the present invention, the structure is determined to be that of the present invention.

Furthermore, judgement in accordance with the flow chart shown in FIG. 2 is performed again by using a structure obtained by arranging one 12-mm square Pd plate and two 6-mm square Pd plates near the center of the Si sputtering target unlike Example 1. In this case, an image shown on the right in (b) of FIG. 2 is the corresponding image. At first, the image is binarized. As a result, it is soon found that the upper surfaces of some columnar members apparently have an elongated shape having a bent portion, so that one realizes it is not easy to calculate the average diameter Dl in the major axis direction. Therefore, the area of the upper end face of each of the columnar members is divided by the calculated value of the average diameter Ds in the minor axis direction of about 4 nm in accordance with the process of (c-2) in the chart. The average of the values obtained through the division is calculated. Thus, the average diameter Dl in the major axis direction is about 9 nm. The ratio Dl/Ds is finally calculated to be 9/4, that is, 2.25. Therefore, it is shown that the resultant structure belongs to the structure of the present invention because the ratio is less than 5.

EXAMPLE 3

This example shows that the structure of the present invention can be selected from plural materials in which a correlation is found to show the existence of the structure irrespective of the materials.

Film formation is attempted on a composition in which the upper end face of a columnar member of a phase-separated structure is of a circular shape as in the case of Example 1 in each of a $Cu_3Si$—Si system, a PdSi—Si system, a NiSi—Si system, a $CoSi_2$—Si system, a $TiSi_2$—Si system, a $WSi_2$—Si system, a $Cu_3Ge$—Ge system, a PdGe—Ge system, a NiGe—Ge system, and a $TiGe_2$—Ge system. Observation with a scanning electron microscope reveals that the average diameter of those structures is as shown in Table 1 and Table 2 previously described, in which the composition of the PdSi—Si system here is different from that of Example 1.

Table 1 and Table 2 each list a eutectic temperature [° C.] read from the equilibrium diagram of bulk and the average diameter [mm] of the columnar members observed in this example. The correlation between the previously described expressions [1] and [2] can be found from the temperature and the average diameter.

As described above, a meaningful relationship can be derived, which indicates not largely depending on dissimilar materials or a difference in composition in deposition conditions or compositions with which a similar structure can be obtained. This is an unexpected, new discovery, and is one of the most important items in the present invention.

EXAMPLE 4

This example relates to a correlation concerning the condition that the structure size or the like of the structure of the present invention varies even in the same material and composition.

In this example, description will be given of a PdSi—Si system as a representative example. Film formation is performed under the same conditions as those of Example 3 except that only the temperature of the substrate is changed to room temperature (25° C.), 200° C., and 300° C. Then, the average diameter of the upper end face of PdSi forming columnar members is measured. The result is as shown in Table 3. That is, the average diameter of the columnar members of a structure to be formed varies with the temperature of the substrate as shown in Table 3. The correlation represented by the above expression [3] can be found from this result.

This correlation is also one of the most important items in the present invention. The correlation together with Example 3 can provide a guideline on what kind of material is preferably subjected to film formation under what kind of conditions in order to obtain the desired diameter of a columnar member.

EXAMPLE 5

This example relates not to a change in structure owing to the kind or composition of a raw material but to a change in structure with a parameter that can be controlled in a sputtering process.

At first, examples of a parameter in the sputtering method include distance between a sputtering target and a substrate, input electric power, kind and pressure of a process gas, temperature of the substrate and application of a substrate bias.

At first, electric power to be input to a 4-inch target is set to 120 W, and an argon gas pressure and the temperature of a substrate are fixed to 0.1 Pa and room temperature, respectively. A PdSi—Si system is used as a representative example to observe a difference in structure among distances between the sputtering target and the substrate (each of which may hereinafter be referred to as the substrate distance) of 60 mm, 90 mm, and 120 mm. A Ge substrate is used as the substrate. With increasing substrate distance, the boundary between columnar structures of PdSi is observed to become slightly unclear and the size distribution is observed to enlarge. Therefore, it can be confirmed that energy is lost during the travel of the flying raw material particles caused to sputter to the substrate with increasing substrate distance.

Next, the distance between the sputtering target and the substrate is fixed to 90 mm, and a comparison between an input electric power of 200 W and an input electric power of 120 W is performed. The columnar structures of PdSi are observed to become slightly unclear, and their average diameter is observed to reduce. Therefore, it can be confirmed that phase separation due to the diffusion of elements on the substrate is inhibited by the fast deposition rate with an increase in deposition rate due to an increase in input electric power.

Furthermore, the distance between the sputtering target and the substrate and input electric power are fixed to 90 mm and 120 W, respectively, and a difference in structure between an argon gas pressure of 0.25 Pa and an argon gas pressure of 0.1 Pa is observed. With increasing argon gas pressure, the average diameter of PdSi having columnar structures is observed to reduce, and a boundary between the columnar structures is observed to become slightly unclear. That is, it can be confirmed that it is attributable to the loss of energy of raw material particles during the flying of the particles with increasing gas pressure and the inhibition of diffusion on the substrate.

The substrate temperature is as shown in Example 4. It should be noted that a substrate temperature near a eutectic temperature in the equilibrium diagram of bulk is not preferable because not diffusion on a two-dimensional surface but three-dimensional diffusion as in bulk is dominant. However, it can be found that the description of Example 4 is approximately valid up to a certain temperature.

Finally, the application of a substrate bias will be described. Substrate biases of DC 0 V, −20 V, and −40 V were applied with the distance between the sputtering target and the substrate, input electric power, argon gas pressure, and temperature of the substrate set to 90 mm, 120 W, 0.1 Pa, and room temperature, respectively. It should be noted that a substrate having a low resistance is used because no DC bias can be applied when a substrate has a large resistance. The application of an RF bias can cope with an insulating substrate. In this case, the average diameter, which is small when no bias is applied, of the columnar structures of PdSi is found to significantly increase with increasing applied bias. For example, an effect of a substrate bias is as described below. An ionized particle is drawn into a substrate, and is caused to collide with a particle on the substrate, and the energy of surface diffusion increases as a result of energy transfer, thereby increasing an average diameter. It is also found that when this effect is excessive, a phenomenon similar to that in the case of sputtering occurs, so a particle on the surface of the substrate desorbs, thereby resulting in no formation of a film.

As can be seen from the foregoing, a structure can be controlled by changing various parameters in the sputtering method.

EXAMPLE 6

This example relates to a porous structure obtained by removing only columnar member portions from the structure having a phase-separated structure of the present invention.

Description will be given of the PdSi—Si system shown in Example 1 as a representative example. At first, a filmy structure obtained when arranging three 12-mm square Pd plates near the center of a sputtering target and a filmy structure obtained by changing the temperature of a substrate to 300° C. in the preceding circumstance are prepared. The columnar members of the former filmy structure are composed of Si, and have an average diameter of about 3 nm. On the other hand, the columnar members of the latter filmy structure are composed of Si, and have an average diameter of about 5 nm.

The porous structure of the present invention can be formed by removing the Si portions of each of the filmy structures. An approach having selectivity with which only Si can be etched is preferably adopted for the removal of the Si portions. It is found that Si can be selectively etched through immersion in an aqueous solution of KOH at about 60° C. However, in the former case of this example, a PdSi portion surrounding Si in the form of columnar members is not sufficiently crystallized, and is of an amorphous state. Therefore, the PdSi portion is also found to be slowly etched simultaneously with the etching of Si owing to the presence of a dangling bond of Si. On the other hand, in the latter case, the crystallization of the PdSi portion has progressed, so only the target Si columnar members are removed without the corrosion of the PdSi portion in the etching. As a result, a porous structure can be obtained. The etching, which has been performed in a liquid in the foregoing, can be preferably performed in a vapor phase as well. In view of the foregoing, a method utilizing selective etching of Si in an $XeF_2$ gas atmosphere can be attempted on each of the above two kinds of filmy structures. It is confirmed that the former filmy structure is not preferably applicable to the formation of the porous structure of the present invention because not only the Si portions constituting the columnar members but also Si of the PdSi portion is removed. However, it can be confirmed that, in the latter filmy structure, PdSi is crystallized so sufficiently that only the Si columnar member portions are selectively etched.

As can be seen from the foregoing, the structure having a phase-separated structure of the present invention is not limited to the case where a compound portion between the element A and $Si_nGe_{1-n}$ (where $0 \leq n \leq 1$) is sufficiently crystallized. The use of a structure in which the crystallization of a compound portion between the element A and $Si_nGe_{1-n}$ (where $0 \leq n \leq 1$) has progressed to some extent is preferable for selective etching upon formation of the porous structure of the present invention.

In addition, this example is described with a structure composed of a compound comprised of the element A and $Si_nGe_{1-n}$ (where $0 \leq n \leq 1$) and $Si_nGe_{1-n}$ (where $0 \leq n \leq 1$) as a starting point. However, the same holds true for a structure composed of the compound comprised of the element A and $Si_nGe_{1-n}$ (where $0 \leq n \leq 1$) and the element A. In other words, selective etching can be performed by utilizing high chemical resistance, heat resistance, or the like of the compound between the element A and $Si_nGe_{1-n}$ (where $0 \leq n \leq 1$) the crystallization of which has progressed. Furthermore, when the element A is a metal, selective etching can be easily performed by means of, for example, an acid or alkali etching solution proper to the metal. In this case, the porous structure of the present invention can be obtained even when the compound portion between the element A and $Si_nGe_{1-n}$ (where $0 \leq n \leq 1$) is not sufficiently crystallized because the metal is readily soluble in an acid although the solubility varies from metal to metal.

EXAMPLE 7

This example relates to a needle-like structure obtained by removing a portion except columnar member portions from the structure having a phase-separated structure of the present invention.

Description will be given of the PdSi—Si system shown in Example 1 as a representative example in accordance with the approach of Example 6. At first, a filmy structure obtained by arranging one 12-mm square Pd plate near the center of a sputtering target and a filmy structure obtained by changing the temperature of a substrate to 300° C. in the preceding circumstance are prepared. The columnar members of the former filmy structure are composed of PdSi, and have an average diameter of about 3 nm. On the other hand, the columnar members of the latter filmy structure are composed of PdSi, and have an average diameter of about 5 nm. Of course, the portion except columnar portions is composed of Si.

The needle-like structure of the present invention can be formed by removing the Si portions of each of the filmy structures. An approach having selectivity with which only Si can be etched is preferably adopted for the removal of the Si portions. It is found that Si can be selectively etched through immersion in an aqueous solution of KOH at about 60° C. However, in the former case of this example, a PdSi portion in the form of columnar members is not sufficiently crystallized, and is of an amorphous state. Therefore, the PdSi portion is also found to be slowly etched simultaneously with the etching of Si owing to the presence of a dangling bond of Si. On the other hand, in the latter case, the crystallization of the PdSi portion has progressed, so only the target Si composing a portion of except columnar members are removed without the corrosion of the PdSi portion in the etching. As a result, a needle-like structure can be obtained. The etching, which has been performed in a liquid in the foregoing, can be preferably performed in a vapor phase as well. In view of the foregoing, a method utilizing selective etching of Si in an $XeF_2$ gas atmosphere can be attempted on each of the above two kinds of filmy structures. It is confirmed that the former filmy structure is not preferably applicable to the formation of the needle-like structure of the present invention because not only the Si portions constituting the portion except columnar members but also Si of the PdSi portion constituting the columnar members is removed. However, it can be confirmed that, in the latter filmy structure, PdSi is crystallized so sufficiently that only the Si constituting the portion except columnar member portions are selectively etched.

As can be seen from the foregoing, the structure having a phase-separated structure of the present invention is not limited to the case where a compound portion between the element A and $Si_nGe_{1-n}$ (where $0 \leq n \leq 1$) is sufficiently crystallized. The use of a structure in which the crystallization of a compound portion between the element A and $Si_nGe_{1-n}$ (where $0 \leq n \leq 1$) has progressed to some extent is preferable for selective etching upon formation of the needle-like structure of the present invention.

In addition, this example has been described with a structure composed of a compound between the element A and $Si_nGe_{1-n}$ (where $0 \leq n \leq 1$); and $Si_nGe_{1-n}$ (where $0 \leq n \leq 1$) as a starting point. However, the same holds true for a structure composed of the compound between the element A and $Si_nGe_{1-n}$ (where $0 \leq n \leq 1$) and the element A. In other words, selective etching can be performed by utilizing high chemical resistance, heat resistance, or the like of the compound between the element A and $Si_nGe_{1-n}$ (where $0 \leq n \leq 1$) the crystallization of which has progressed. Furthermore, when the element A is a metal, selective etching can be easily performed by means of, for example, an acid or alkali etching solution proper to the metal. In this case, the needle-like structure of the present invention can be obtained even when the compound portion between the element A and $Si_nGe_{1-n}$ (where $0 \leq n \leq 1$) is not sufficiently crystallized because the metal is readily soluble in an acid although the solubility varies from metal to metal.

EXAMPLE 8

This example relates to an electronic device using the structure having a phase-separated structure of the present invention.

Three electrodes are arranged on an upper portion of the structure 1401 of the present invention. When the electrodes are arranged just as shown in FIG. 14, one substantially columnar member is arranged among the electrodes. This situation can be realized by using, as a representative example, the structure of the present invention composed of NiSi columnar members each composed of a NiSi—Si system and Si surrounding the members. A tunnel current between left and right electrodes (the source electrode 1403 and the drain electrode 1404) shown in FIG. 14 is measured. When a bias is applied at a lower electrode (the gate electrode 1402) shown in FIG. 14, no tunnel current is observed. However, the cancellation of the bias enables a tunnel current to be observed. As a result, it can be confirmed that electrons passed between electrodes while tunneling through a Si region between NiSi columnar members. Therefore, the use of the structure of the present invention is found to be effective for an electronic device or single electronic device such as a quantum dot or a quantum wire.

EXAMPLE 9

This example relates to a gate electrode using the structure having a phase-separated structure of the present invention.

Figure 15A:
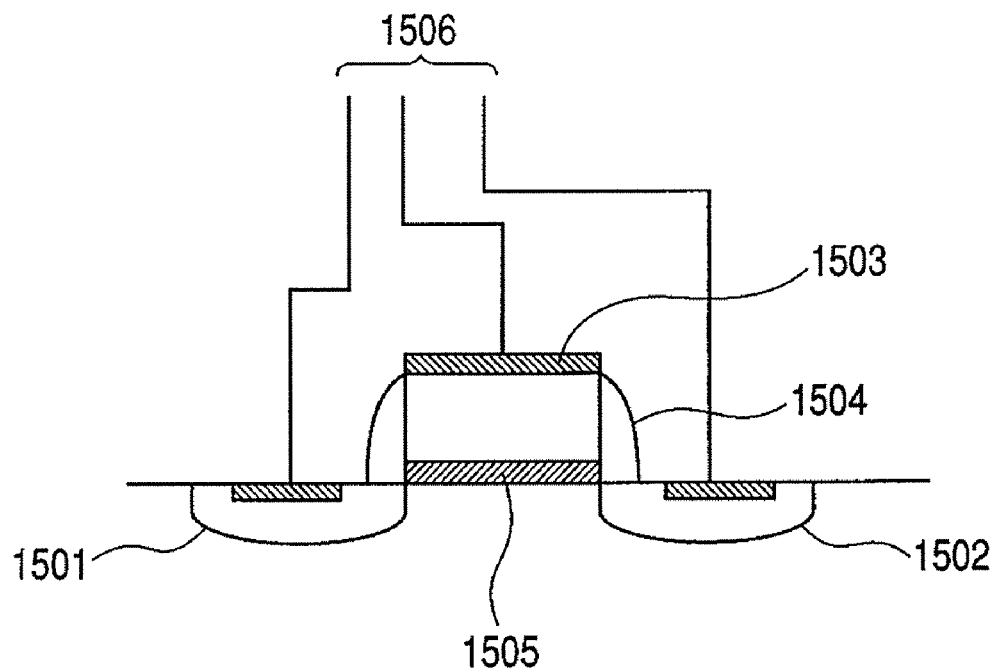
FIGS. 15A and 15B are schematic views each showing an electrode portion of a transistor.
Figure 15B:
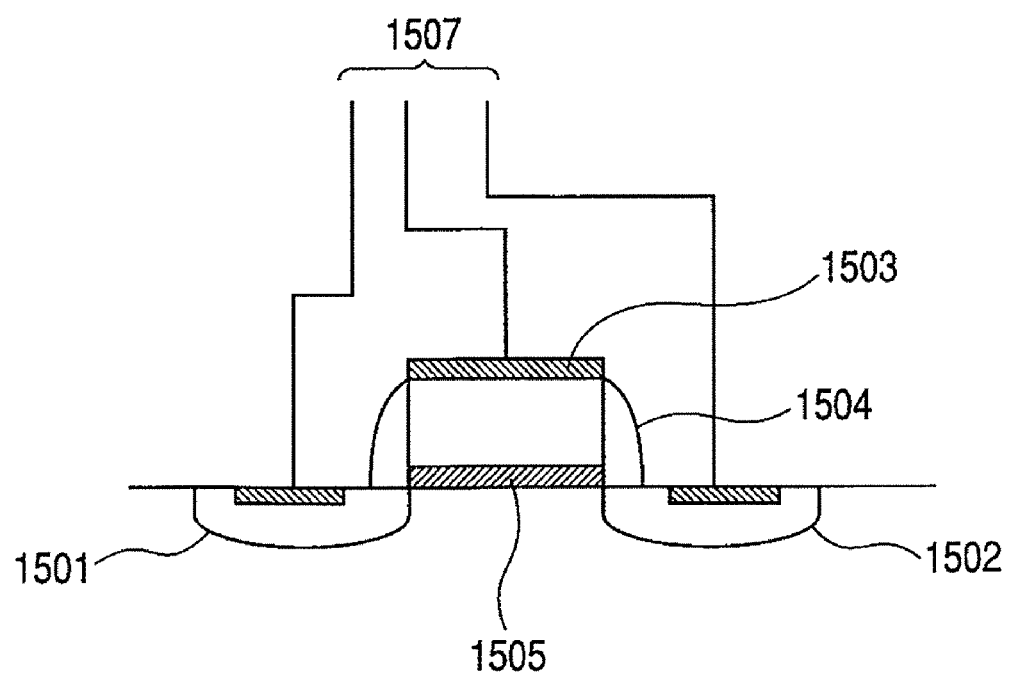

A filmy structure 1507 of the present invention having columnar members each composed of $TiSi_2$, $CoSi_2$, or the like and Si surrounding the members will be taken as a representative example. Film formation is conducted on a gate electrode portion 1503 shown in FIG. 15B is formed (the formation is applicable to each of the source electrode portion 1501 and the drain electrode portion 1502). In a comparative example, a metal film composed of Ti, Co, or the like is similarly deposited, and is diffused through quick heating to form, at an interface, the gate electrode portion 1503 composed of the silicide 1506 such as $TiSi_2$ or $CoSi_2$ (the formation is applicable to each of the source electrode portion 1501 and the drain electrode portion 1502). In FIGS. 15A and 15B, reference numeral 1504 denotes a spacer, and reference numeral 1505 denotes a gate oxide film. The leak current values of transistors using those electrodes are compared. As a result, it can be confirmed that, when the structure of the present invention is used, a columnar member portion guides a current only to a vertical direction so that leak in an in-plane direction is suppressed. Therefore, it is found to be effective to provide the gate electrode of the present invention with anisotropy in the direction in which a current is caused to flow.

EXAMPLE 10

This example relates to a magnetic recording medium using the structure having a phase-separated structure of the present invention for controlling a recording layer.

At first, the characteristic of the phase-separated structure of the structure of the present invention originates from materials having a eutectic relationship over a wide temperature region. In other words, the materials have a simple eutectic phase diagram as shown in FIG. 4C or 4D. The structure of the present invention is superior to the phase-separated structure in a currently used CoCr-based magnetic recording medium in variance of the average diameter of columnar members and the like and shape of a columnar member. Furthermore, a layer region with disordered initial crystalline orientation or the like called the initial layer of the recording layer 803 in a magnetic recording medium of FIG. 8 has been found to adversely affect magnetic recording property or the like. The structure of the present invention is used as the underlayer 802 to overcome this adverse effect. As a result, the columnar member portions of the structure each serve as a nucleus for causing a magnetic particle of the recording layer 803 to start its epitaxial growth from an initial stage of the formation of the recording layer. Thus, the recording layer 803 extremely excellent in control of the shape and crystallinity of a magnetic particle can be formed.

At first, a PdSi—Si system serving as the structure of the present invention is taken as a representative example, and is prepared as an underlayer. Subsequently, a CoCrPt—$SiO_2$-based material is deposited by means of sputtering. The observation of the sample from a sectional direction by means of a transmission electron microscope can confirm that PdSi forming a columnar member of the underlayer composed of the structure of the present invention and CoCrPt forming a recording layer are epitaxially connected to each other to undergo crystal growth. It can be also confirmed that a $SiO_2$ portion grows in correspondence with a Si portion surrounding PdSi, so CoCrPt can form a recording layer while the variance of the diameter of PdSi in the underlayer is kept low. This situation is important in providing a low-noise magnetic recording medium.

As described above, the structure of the present invention can serve as an extremely excellent underlayer in crystal growth.

EXAMPLE 11

This example relates to a magnetic recording medium using the porous structure of the present invention.

The porous structure of the present invention obtained in Example 6 is prepared. It should be noted that a metal layer composed of Pt is formed below the layer of the porous structure. The porous structure is immersed in a plating solution mainly composed of cobalt sulfamate, and a voltage is applied through the Pt layer. A potential of −1.0 V is applied to Ag/AgCl as a reference electrode. As a result, cobalt is deposited from the bottom portion of each fine pore of the porous structure. Therefore, a film having fine pores all of which are filled with cobalt can be obtained. Thus, the fine pores of the porous structure can be filled with a desired hard magnetic material by means of a plating technique as long as a plating solution can be prepared. At that time, plating can be performed with a metal layer composed of a low-resistance metal arranged below the porous structure. Not only electroplating but also electroless plating is found to be applicable.

As described above, a recording layer composed of a film filled with a magnetic material is formed. After that, diamondlike carbon is deposited to serve as a protective-layer, and a lubricant composed of perfluoropolyether is applied to form a lubricant layer. As a result, a recordable/reproducible medium can be obtained.

The magnetic recording medium thus obtained is resistant to alteration and impact in a use environment because a portion except the hard magnetic particle portion of the recording layer is composed of a compound between the element A and $Si_nGe_{1-n}$ (where $0 \leqq n \leqq 1$) excellent in strength.

In addition, the medium is extremely useful as a low-noise magnetic recording medium as well because magnetic particles are sufficiently separated. In particular, when the diameter of a magnetic particle is set to be 8 nm or less, a material mainly composed of an ordered alloy such as CoPt or FePt is also available.

EXAMPLE 12

This example relates to a magnetic recording medium using the porous structure of the present invention.

The porous structure of the present invention obtained in Example 6 is prepared. It should be noted that a metal layer composed of Pt is formed below the layer of the porous structure. The porous structure is immersed in a soft magnetic plating solution mainly composed of nickel sulfamate and iron chloride, and a voltage is applied through the Pt layer. A potential of −1.2 V is applied to Ag/AgCl as a reference electrode. As a result, a nickel-iron alloy is deposited from the bottom portion of each fine pore of the porous structure. Therefore, a film having fine pores all of which are filled with the nickel-iron alloy can be obtained. Thus, the fine pores of the porous structure can be filled with a desired soft magnetic material by means of a plating technique as long as a plating solution can be prepared. At that time, plating can be performed with a metal layer composed of a low-resistance metal arranged below the porous structure. Not only electroplating but also electroless plating is found to be applicable.

As described above, a recording layer (one composed of CoCrPt—$SiO_2$-based material) is formed after the formation of a soft magnetic layer composed of a film filled with a soft magnetic material. Furthermore, diamondlike carbon is deposited to serve as a protective layer, and a lubricant composed of perfluoropolyether is applied to form a lubricant layer. As a result, a recordable/reproducible medium can be obtained. An underlayer may be arranged between the soft magnetic layer and the recording layer.

The magnetic recording medium thus obtained is resistant to alteration and impact in a use environment because a portion except the soft magnetic particle portion of the soft magnetic layer is composed of a silicide excellent in strength.

In addition, the medium is extremely useful as a magnetic recording medium without spike noise or the like originating from a soft magnetic layer because soft magnetic particles are sufficiently separated.

EXAMPLE 13

This example relates to a magnetic recording/reproducing device using the magnetic recording medium of the present invention.

A device composed of a magnetic recording medium 1200, magnetic recording medium driving portion 1201, magnetic head 1202, magnetic head driving portion 1203, and signal processing portion 1204 as shown in FIG. 12 is assembled by means of the magnetic recording medium of the present invention as shown in Examples 10, 11, and 12. As a result, a magnetic recording/reproducing device can be formed. This example does not limit the driving of the magnetic recording medium 1200 of the present invention to rotation and not limit the driving of the magnetic head 1202 to sliding on a circumference.

EXAMPLE 14

This example relates to an information processing system using the magnetic recording/reproducing device of the present invention.

Information can be output from/input to the magnetic recording/reproducing device portion 1301 shown in FIG. 13. Therefore, as shown in FIG. 13, an information processing system can be formed by housing, in a housing container 1300, magnetic recording/reproducing device portion 1301, memory portion 1303, operating portion 1302, external input/output portion 1305, power source 1304, and wiring 1306 for connecting them. The wiring 1306 plays its role as long as information can be exchanged irrespective of whether the wiring is cabled or wireless.

EXAMPLE 15

This example relates to a functional film having catalytic ability using the porous structure of the present invention. Here, a PtSi—Si-based structure is taken as a representative example of the structure of the present invention.

Figure 16A:
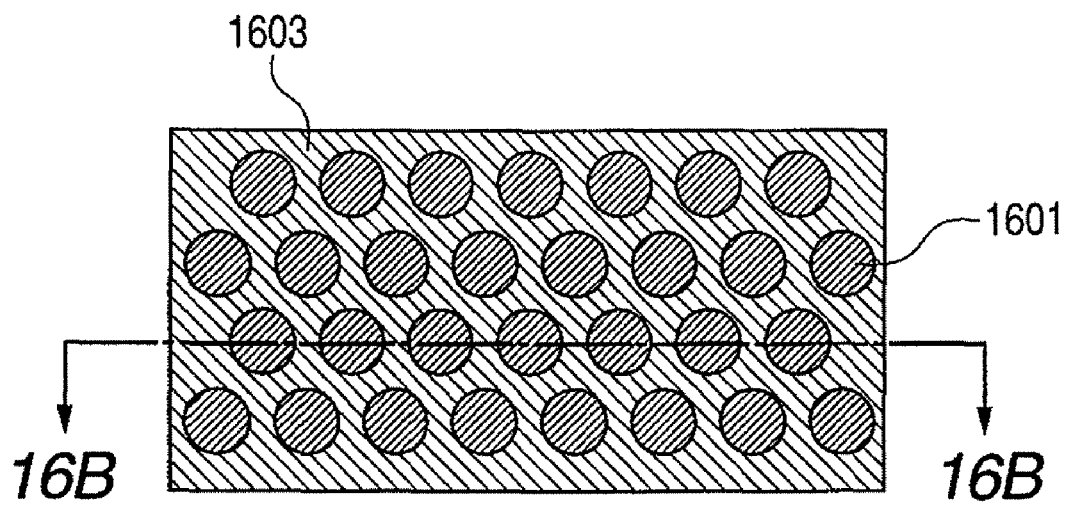
FIGS. 16A and 16B are schematic views each showing a functional film having catalytic ability using the porous structure of the present invention.
Figure 16B:
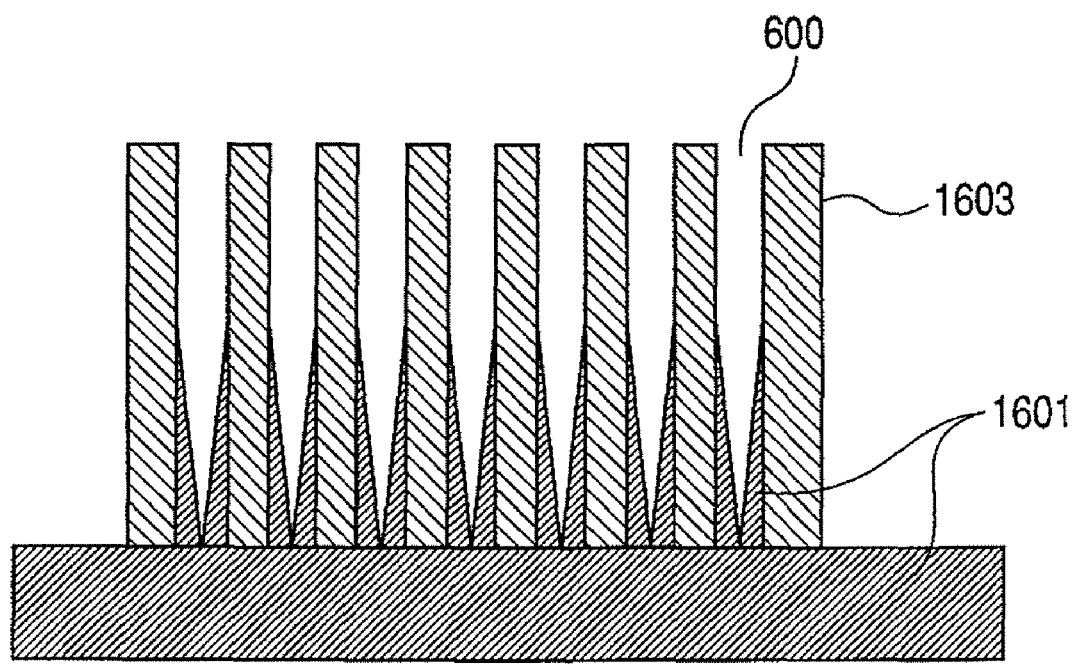

Four 15-mm square Pt plates were arranged on the center of a Si sputtering target, and sputtering was conducted at a substrate temperature of 300° C., an RF electric power of 120 W, and an argon gas pressure of 0.1 Pa. Thereby, a PtSi—Si-based structure having a thickness of 1 μm was produced on the substrate 104 having a W underlayer. Then, the selective etching of a Si portion by means of an $XeF_2$ gas was conducted to confirm that a PtSi membrane is formed. Furthermore, an electrolyte film for a fuel cell can be applied and bonded under pressure, and peeled off. Thus, the PtSi membrane is peeled off of the substrate 104 so that a functional film that can be used as a catalyst for a fuel cell can be formed, in which an electrolyte film 1601 and a noble-metal-containing membrane 1603 are integrated with each other as shown in FIGS. 16A (a plan view) and 16B (a sectional view taken along the line 16B-16B of FIG. 16A). The current density and fuel cell voltage property of the functional film are compared with those of a catalyst obtained by causing carbon black to carry a general noble metal particle (one caused to carry a noble metal has a thickness of 1 μm) as a comparative example. It can be confirmed that the current density of the functional film having catalytic ability of the present invention is about 2.5 times as high as that of the carrying catalyst as the comparative example at the same voltage output. This indicates that a high current density can be obtained even when the amount of a noble metal to be used per unit volume is small.

EXAMPLE 16

This example relates to a functional film having catalytic ability using the needle-like structure of the present invention. Here, a PtSi—Si-based structure is taken as a representative example of the structure of the present invention.

Figure 17A:
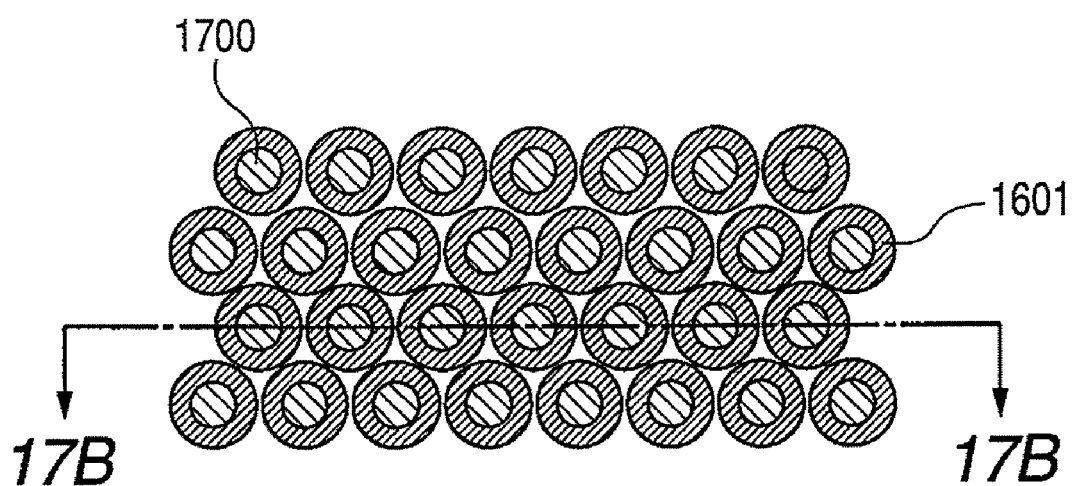
FIGS. 17A and 17B are schematic views each showing a functional film having catalytic ability using the needle-like structure of the present invention.
Figure 17B:
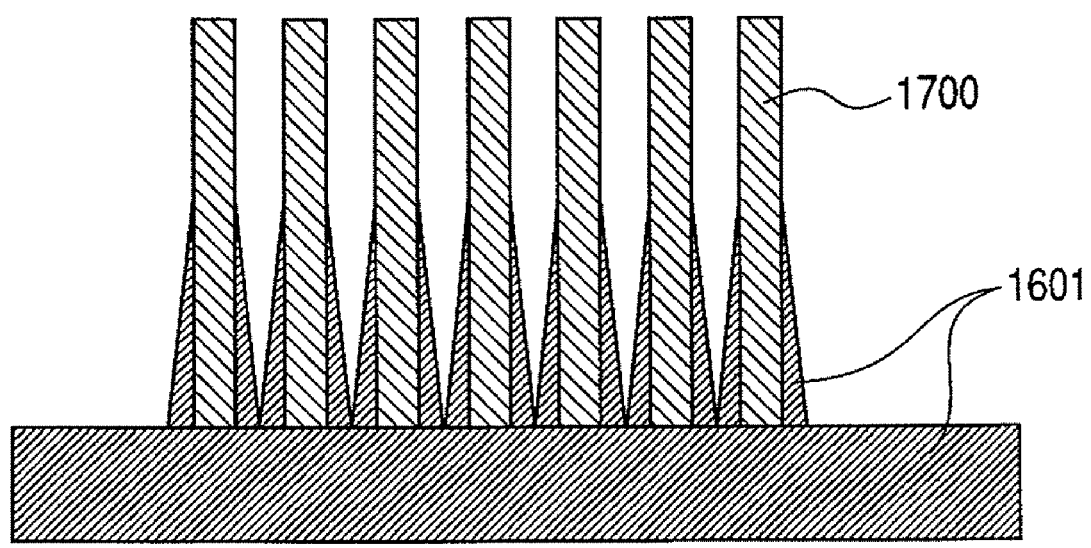

Two 15-mm square Pt plates were arranged on the center of a Si sputtering target, and sputtering was conducted at a substrate temperature of 300° C., an RF electric power of 120 W, and an argon gas pressure of 0.1 Pa. Thereby, a PtSi—Si-based structure having a thickness of 1 µm was produced on the substrate 104 having a W underlayer. Then, the selective etching of a Si portion by means of an $XeF_2$ gas was conducted to confirm that a PtSi rod is formed. Furthermore, an electrolyte film for a fuel cell can be applied and bonded under pressure, and peeled off. Thus, the PtSi rod is peeled off of the substrate 104 so that a functional film that can be used as a catalyst for a fuel cell can be formed, in which an electrolyte film 1601 and a noble-metal-containing rod 1700 are integrated with each other as shown in FIGS. 17A (a plan view) and 17B (a sectional view taken along the line 17B-17B of FIG. 17A). The current density and fuel cell voltage property of the functional film are compared with those of a catalyst obtained by causing carbon black to carry a general noble metal particle (one caused to carry a noble metal has a thickness of 1 µm) as a comparative example. It can be confirmed that the current density of the functional film having catalytic ability of the present invention is about 3 times as high as that of the carrying catalyst as the comparative example at the same voltage output. This indicates that a high current density can be obtained even when the amount of a noble metal to be used per unit volume is small.

EXAMPLE 17

This example relates to an electron emitting device using the structure having a phase-separated structure of the present invention.

Figure 18A:
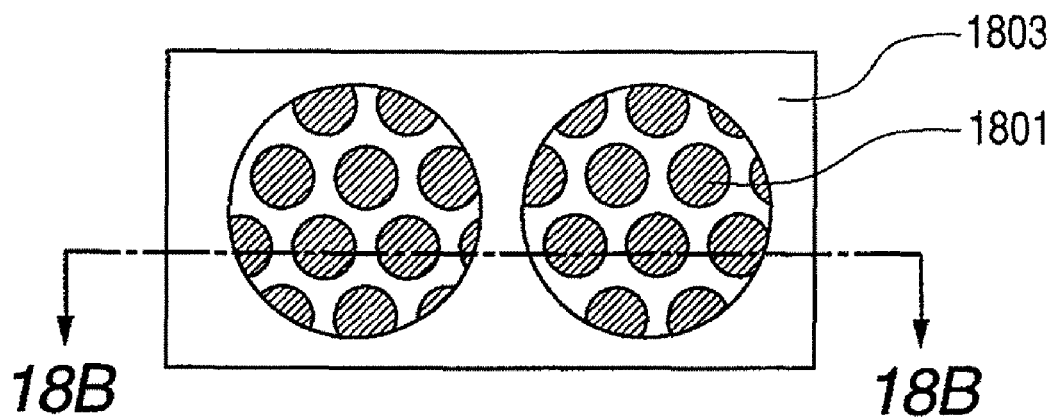
FIGS. 18A and 18B are conceptual views each showing an electron emitting device using the structure of the present invention.
Figure 18B:
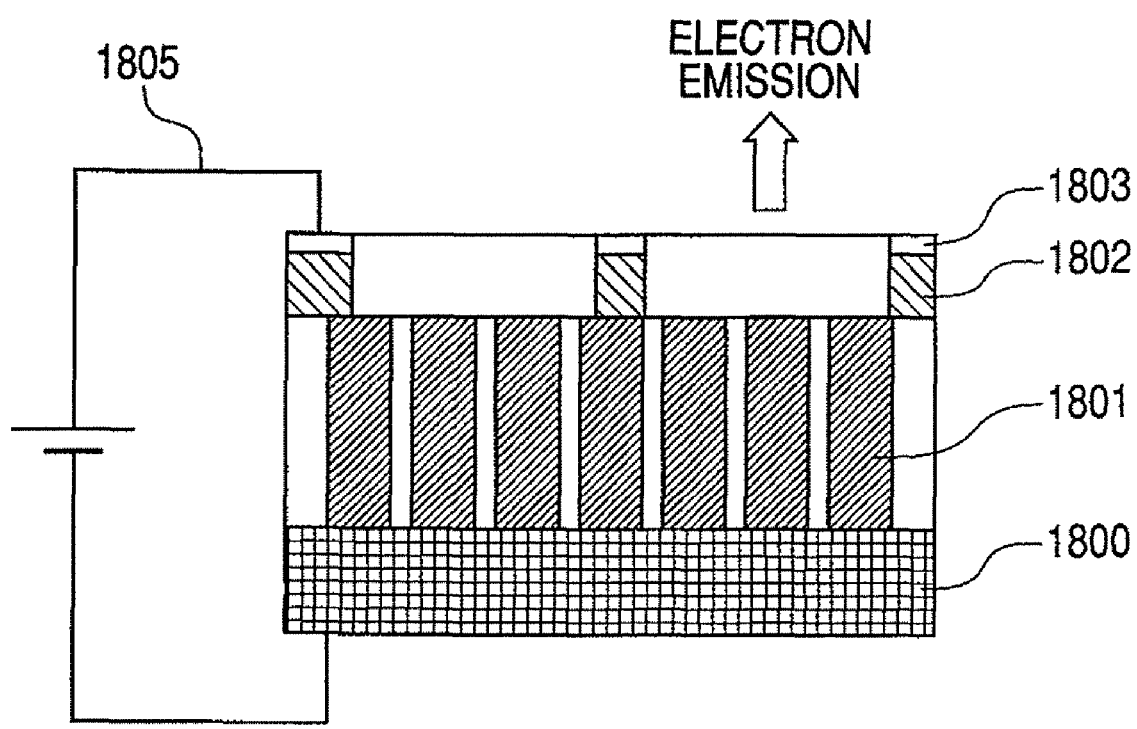

As shown in FIGS. 18A (a plan view) and 18B (a sectional view taken along the line 18B-18B of FIG. 18A), an insulation layer 1802 having an opening and a lead-out electrode 1803 are formed on the structure of the present invention having columnar members each composed of a compound between the element A such as Nb, Mo, W, or Ti and $Si_nGe_{1-n}$ (where $0 \leq n \leq 1$). A voltage is applied between the lead-out electrode 1803 and the structure of the present invention. It can be confirmed that the voltage application enables electrons to be efficiently released from the columnar members of the structure. In FIGS. 18A and 18B, reference numeral 1801 denotes an electron emitting portion, and reference numeral 1805 denotes a bias applying circuit. Furthermore, the following effect is obtained. That is, it can be confirmed that the columnar members composed of the compound between the element A and $Si_nGe_{1-n}$ (where $0 \leq n \leq 1$) bring forth extremely high heat resistance. It can be also confirmed that an electron emitting device having a long lifetime and a stable current value upon electron emission can be obtained.

EXAMPLE 18

This example relates to an electron emitting device using the needle-like structure of the present invention.

As shown in FIGS. 19A (a plan view) and 19B (a sectional view taken along the line 19B-19B of FIG. 19A), an insulation layer 1802 having an opening and a lead-out electrode 1803 are formed on the structure of the present invention having columnar members each composed of a compound between the element A such as Nb, Mo, W, or Ti and $Si_nGe_{1-n}$ (where $0 \leq n \leq 1$). Furthermore, selective etching by means of $XeF_2$ is performed to remove only the portion of $Si_nGe_{1-n}$ (where $0 \leq n \leq 1$) around a columnar member in a region corresponding to an electron emitting portion 1801, so a void portion 701 is formed. Then, a voltage is applied between the lead-out electrode 1803 and the structure of the present invention. It can be confirmed that the voltage application enables electrons to be efficiently released from the columnar members of the structure. Furthermore, the following effect is obtained. That is, it can be confirmed that the columnar members composed of the compound between the element A and $Si_nGe_{1-n}$ (where $0 \leq n \leq 1$) bring forth extremely high heat resistance. It can be also confirmed that an electron emitting device having a long lifetime and a stable current value upon electron emission can be obtained.

This application claims priority from Japanese Patent Application No. 2005-088981 filed Mar. 25, 2005 and 2005-258274 filed Sep. 6, 2005, which is hereby incorporated by reference herein.

What is claimed is:

1. A method of producing a structure comprising:
    a first member consisting of a compound of an element A and $Si_nGe_{1-n}$ (where $0 \leq n \leq 1$); and
    a second member consisting of one of the element A and $Si_nGe_{1-n}$ (where $0 \leq n \leq 1$),
    wherein one of the first member and the second member comprises columnar members, each having a side face which is surrounded by the other member, wherein the element A comprises one selected from the group consisting of Co, Ni, Cu, Pd and Pt, the method comprising the steps of:
    preparing a substrate; and
    forming a film on the substrate in a non-equilibrium state by means of a material individually or integrally containing $Si_nGe_{1-n}$ (where $0 \leq n \leq 1$) and the element A,
    wherein an average diameter of the columnar members in a minor axis direction is in the range from 0.5 nm to 20 nm inclusive.

2. A method of producing a structure according to claim 1, wherein the step of forming a film is performed by sputtering.

3. A method of producing a structure according to claim 2, wherein a temperature of the substrate is from 25-300° C., a bias voltage to be applied to the substrate is from 0 to −40V, a distance between a sputtering target and the substrate is from 60-120 mm, input electric power is from 60-200 W, and a pressure of a process gas is from 0.1 to 0.2 Pa are selected as the conditions upon formation of the film.

4. A method of producing a structure according to claim 1, further comprising the step of etching the columnar member to provide a porous structure.

5. A method of producing a structure according to claim 1, further comprising the step of etching portions except the columnar member to provide a needle-shaped structure.

6. A method of producing a magnetic recording medium comprising filling void portions of the porous structure according to claim 4 with a hard magnetic material to form a recording layer.

7. A method of producing a magnetic recording medium comprising forming a recording layer and forming a soft magnetic layer by filling void portions of the porous structure according to claim 4 with a soft magnetic material.

* * * * *